United States Patent
Miller, Jr. et al.

(10) Patent No.: US 10,921,823 B2
(45) Date of Patent: Feb. 16, 2021

(54) SENSOR-BASED ANTI-HACKING PREVENTION IN PLATOONING VEHICLES

(71) Applicant: Bendix Commercial Vehicle Systems LLC, Elyria, OH (US)

(72) Inventors: T. Stephen Miller, Jr., Elyria, OH (US); Andrew J Pilkington, Avon Lake, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 372 days.

(21) Appl. No.: 15/856,851

(22) Filed: Dec. 28, 2017

(65) Prior Publication Data

US 2019/0204853 A1 Jul. 4, 2019

(51) Int. Cl.
*G05D 1/02* (2020.01)
*G06F 21/64* (2013.01)
(Continued)

(52) U.S. Cl.
CPC ......... *G05D 1/0295* (2013.01); *G05D 1/0246* (2013.01); *G05D 1/0257* (2013.01);
(Continued)

(58) Field of Classification Search
CPC .. G05D 1/0295; G05D 1/0246; G05D 1/0257; G05D 1/0278; G05D 1/0293;
(Continued)

(56) References Cited

U.S. PATENT DOCUMENTS

| 7,162,369 B2 | 1/2007 | Thorne |
| 8,620,517 B2 | 12/2013 | Caveney et al. |

(Continued)

FOREIGN PATENT DOCUMENTS

| CN | 204086533 U | 1/2015 |
| CN | 105187376 A | 12/2015 |

(Continued)

OTHER PUBLICATIONS

Coelingh, Erik et al. "All Aboard the Robotic Road Train", IEEE Spectrum, posted Oct. 26, 2012, paper, http://spectrum.ieee.org/transportation/advanced-cars/all-aboard-the-robotic-road-train, Dec. 13, 2016, pp. 1-4.

(Continued)

*Primary Examiner* — Paula L Schneider
(74) *Attorney, Agent, or Firm* — Tucker Ellis LLP

(57) ABSTRACT

A platoon management control uses the GPS position of the rear of a lead vehicle. The lead vehicle deceleration demand is overlaid upon the position of the rear of the lead vehicle. The following vehicle uses its own GPS position along with the radar or vision system of the following vehicle to determine the rear of the lead vehicle. When a lead vehicle's deceleration signal is subtracted from the position of the rear of the forward vehicle as determined by the following vehicle, the deceleration profile must be within an acceptable window to be valid. Also, one or more local sensors on adjacent platooning vehicles are used to communicate encoding scheme selection information and also to communicate the deceleration command signals. This permits the following vehicle to decode the deceleration command signals using a decoding scheme corresponding to the encoding scheme indicated as being used by the leading vehicle.

22 Claims, 12 Drawing Sheets

(51) Int. Cl.
*H04W 12/10* (2009.01)
*H04L 9/32* (2006.01)
*H04L 29/06* (2006.01)
*H04W 4/46* (2018.01)
*G08G 1/00* (2006.01)
*H04L 9/08* (2006.01)
*H04L 29/08* (2006.01)
*H04W 12/02* (2009.01)
*B60W 50/00* (2006.01)
*G08G 1/16* (2006.01)

(52) U.S. Cl.
CPC ......... *G05D 1/0278* (2013.01); *G05D 1/0293* (2013.01); *G06F 21/64* (2013.01); *G08G 1/22* (2013.01); *H04L 9/0816* (2013.01); *H04L 9/3228* (2013.01); *H04L 63/123* (2013.01); *H04L 67/12* (2013.01); *H04W 4/46* (2018.02); *H04W 12/10* (2013.01); *B60W 2050/0008* (2013.01); *B60W 2556/65* (2020.02); *G05D 2201/0213* (2013.01); *G08G 1/161* (2013.01); *H04L 63/0428* (2013.01); *H04L 2209/84* (2013.01); *H04W 12/02* (2013.01)

(58) Field of Classification Search
CPC ........... G05D 2201/0213; H04W 4/46; H04W 12/10; H04W 12/02; G06F 21/64; G08G 1/22; G08G 1/161; H04L 9/0816; H04L 9/3228; H04L 63/123; H04L 67/12; H04L 63/0428; H04L 2209/84; B60W 2050/0008; B60W 2550/408; B60W 2556/65
USPC .......................................................... 701/96
See application file for complete search history.

(56) References Cited

U.S. PATENT DOCUMENTS

| | | | |
|---|---|---|---|
| 8,947,531 | B2 | 2/2015 | Fischer et al. |
| 2002/0070849 | A1 | 6/2002 | Teicher et al. |
| 2006/0221328 | A1 | 10/2006 | Rouly |
| 2008/0059007 | A1 | 3/2008 | Whittaker et al. |
| 2013/0211624 | A1 | 8/2013 | Lind et al. |
| 2016/0112201 | A1* | 4/2016 | Misawa ................ H04W 12/06 713/168 |
| 2016/0173530 | A1 | 6/2016 | Miyake |
| 2017/0242443 | A1* | 8/2017 | Schuh .................. G05D 1/0293 |
| 2018/0188725 | A1* | 7/2018 | Cremona ............. G05D 1/0295 |

FOREIGN PATENT DOCUMENTS

| | | |
|---|---|---|
| CN | 105704245 A | 6/2016 |
| EP | 2909065 A1 | 8/2015 |
| KR | 20080080018060 A | 2/2008 |
| WO | 2013006826 A2 | 1/2013 |
| WO | 2013122177 A1 | 8/2013 |
| WO | 2014061021 A1 | 4/2014 |
| WO | 2015047174 A1 | 4/2015 |
| WO | 2016065055 A1 | 4/2016 |
| WO | 2017035516 A1 | 3/2017 |

OTHER PUBLICATIONS

Cornelio Sosa, David A., "An Efficiency-Motivated Attack Against Vehicles in a Platoon: Local Vehicle Control, Platoon Control Strategies, and Drive Train Technologies Considerations" (2014). All Graduate Theses and Dissertations. Paper 2168, Utah State University, pp. 1-68.

Sajjad, Imran et al., "Attack Mitigation in Adversarial Platooning Using Detection-Based Sliding Mode Control", paper, Dept. of Electrical and Computer Engineering, pp. 1-11, Oct. 16, 2015, Utah State University, Logan, UT.

Öncü, Sinan et al., String Stability of Interconnected Vehicles Under Communication Constraints, paper, pp. 1-6, 51st IEEE Conference on Decision and Control, Dec. 10-13, 2012. Maui, Hawaii, USA.

Dadras, Soodeh et al., "Vehicular Platooning in an Adversarial Environment", Conference Paper, Dept. of Electrical and Computer Engineering, pp. 1-13, Apr. 14, 2015, Utah State University, Logan, UT.

Martinec, Dan et al., "Wave-absorbing vehicular platoon controller", paper, pp. 1-14, Jul. 11, 2014, Department of Control Engineering, Czech Technical University in Prague, Czech Republic.

International Search Report and Written Opinion from corresponding International Application No. PCT/US2018/067040, dated Mar. 11, 2019; 13 pages.

* cited by examiner

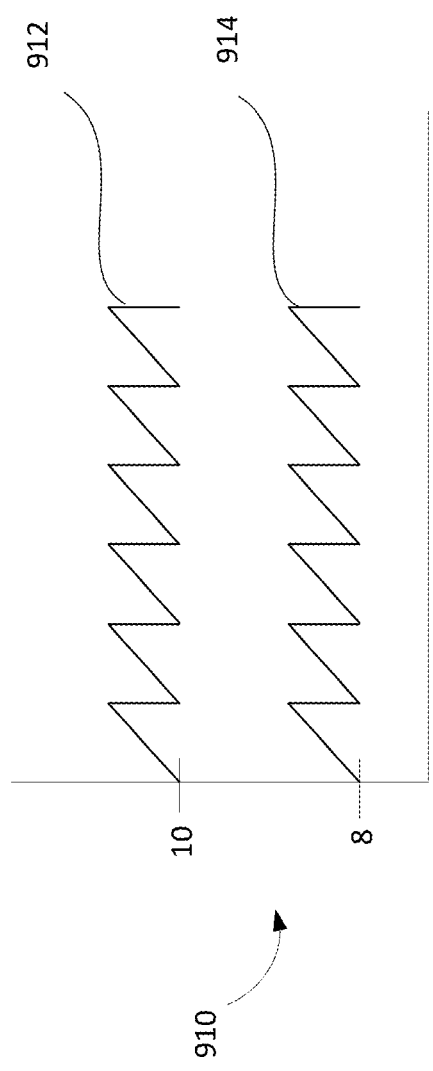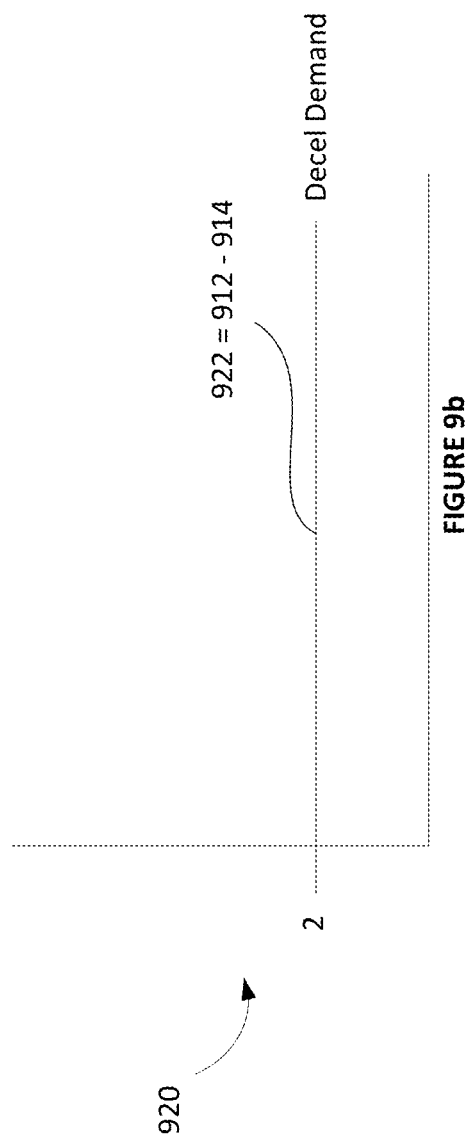

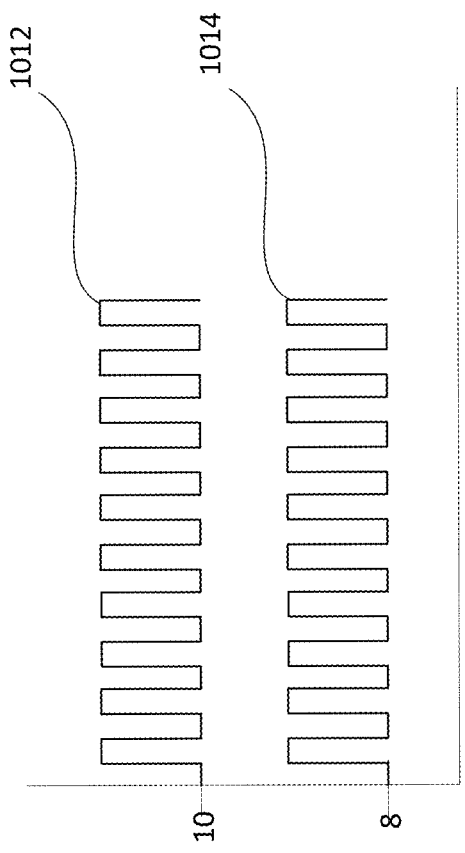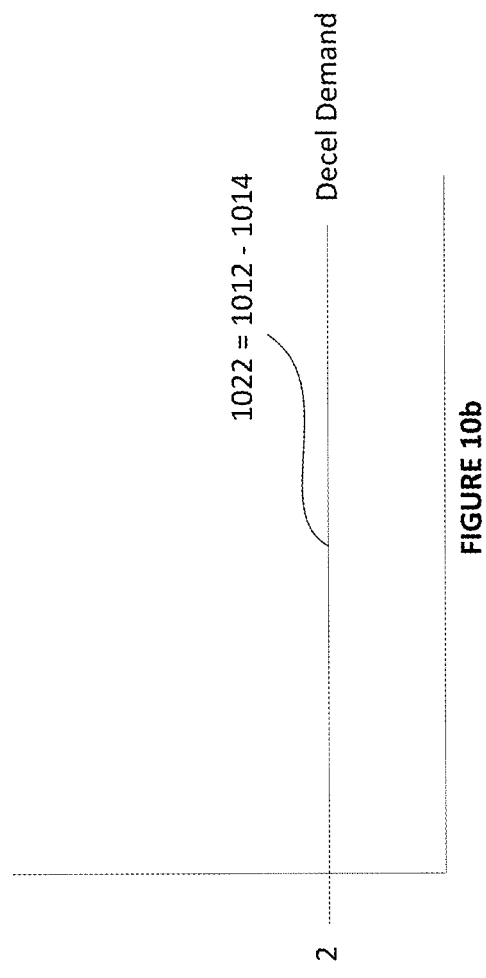

SENSOR-BASED ANTI-HACKING PREVENTION IN PLATOONING VEHICLES

TECHNICAL FIELD

The embodiments herein relate generally to highway vehicle platoon management. More specifically, particular embodiments relate to commercial highway vehicle platoon management where the detection by platoon member vehicles of counterfeit, false or otherwise spurious control signals is important for protecting the safety and maintaining the efficiency of the platoon Although the embodiments will be described with reference to selected particular examples such as for example vehicles traveling seriatim in the platoon, it is to be appreciated that the claimed invention is also amenable to other applications and can be equivalently extended to other embodiments and environments.

CROSS REFERENCE TO RELATED APPLICATIONS

This application is related to U.S. application Ser. No. 15/856,390, filed Dec. 28, 2017, entitled: INITIALIZATION AND SAFETY MAINTENANCE STRATEGY FOR PLATOONING VEHICLES; U.S. application Ser. No. 15/850,942, filed Dec. 21, 2017, entitled: DETERMINING AND USING BRAKING CAPABILITIES OF VEHICLES FOR PLATOONING DECELERATION OPERATIONS; U.S. application Ser. No. 15/395,160, filed Dec. 30, 2016, entitled: VARYING THE DISTANCE BETWEEN VEHICLES IN A PLATOON; U.S. application Ser. No. 15/395,219, filed Dec. 30, 2016, entitled: SELF-ORDERING OF FLEET VEHICLES IN A PLATOON; U.S. application Ser. No. 15/395,251, filed Dec. 30, 2016, entitled: DETECTION OF EXTRA-PLATOON VEHICLE INTERMEDIATE OR ADJACENT TO PLATOON MEMBER VEHICLES; and U.S. application Ser. No. 15/395,214, filed Dec. 30, 2016, entitled: "V" SHAPED AND WIDE PLATOON FORMATIONS, the contents of each of these applications being incorporated herein by reference in their entirety.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. Larger platoons can involve many follower vehicles for providing enhanced efficiency, but ensuring the safety of to both the platooned vehicles as well as of the other non-platooning vehicles on the roadway most usually dictate the short single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. On graded roadways, the relatively even distance maintained between the vehicles is often modified to improve or otherwise maintain or enhance the overall safety and efficiency of the platoon. For example, the even distance maintained between the vehicles can be decreased during conditions of the platoon traversing an incline wherein the tendency of the overall platoon is to decrease speed slightly. Conversely, the even distance maintained between the vehicle can be increased during conditions of the platoon traversing a decline wherein the tendency of the overall platoon is to increase speed slightly. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platoons that operate on public roadways, however, must contend with additional factors such as other vehicles that might broadcast deceleration command signals that are legitimate relative to that vehicle but that might not be recognized or worse, might be improperly interpreted by the platooning vehicles as valid or otherwise authentic deceleration command signal(s). In addition, malicious actors such as hackers for example might purposefully generate and broadcast illegitimate or otherwise invalid deceleration command signals for nefarious reasons. Vehicle hacking is becoming an increasing concern as more electronic components are installed into vehicles. While hacking into a vehicle and commanding braking may lead to a crash, there are many benefits to allowing external sources to command vehicle braking. For example, while platooning high levels of vehicle deceleration may be required, and the sooner a lead vehicle can command deceleration to a following vehicle the more likely a crash can be averted. A high integrity deceleration demand from an external source is necessary for externally commanded vehicle deceleration. This being the situation, vehicles of a platoon must be able to discover or otherwise recognize hacked deceleration command signals so that these invalid signals are not acted upon in order to preserve the efficiency and safety benefits deriving from platoon participation.

The present embodiments provide for a new and improved platoon management control system and method for detection and determination of illegitimate or otherwise hacked or spurious deceleration command signals by locally validating deceleration command signals between adjacent platooning vehicles.

The systems and methods of the embodiments detect the illegitimate or otherwise hacked or spurious deceleration command signals using vehicle sensing and control processing techniques local to each of the platoon vehicles. In that way, reliance upon the functionality or ability to receive GPS signals as well as reliance upon a remote and/or centralize management control operation is not necessary, resulting in a fast and independent determination and an ability to make correspondingly fast and independent further platooning decisions when deceleration command signals are received by the platooning vehicles.

The present embodiments provide for new and improved detection of improper deceleration command signals using sensors and control units local to each vehicle of the platoon, for new and improved platoon maintenance with added safety benefits.

The present embodiments also provide for new and improved sensor-based anti-hacking prevention in platooning vehicles, for new and improved platoon maintenance with added safety benefits. The present embodiments use information from a separate sensor (e.g. the radar or camera) to validate incoming communication and/or command signal(s) from an external source. This technique is very well suited for communication of platoon management commands or other information between pairs of immediately adjacent platooning vehicles.

The present embodiments also further provide for new and improved anti-hacking prevention in platooning vehicles using a combination of global positioning system (GPS) data and locally derived sensor value data, for new and improved platoon maintenance with added safety benefits.

Still yet further, the present embodiments further provide for new and improved anti-hacking prevention in platooning vehicles using local encryption and decryption of deceleration command signals using one or more sensors on the vehicles.

SUMMARY OF THE EXAMPLE EMBODIMENTS

The embodiments permit two or more vehicles moving along a roadway to cooperate as a road train or a "platoon" without interference from non-platooning or interloper vehicles broadcasting spurious deceleration command signals for mutual safety and efficiency benefits of the platoon.

In accordance with one aspect, a platoon management control system and method locally detects and determines a non-platooning vehicle inserted or otherwise disposed between and/or adjacent to one or more platooning vehicle (s).

In accordance with another aspect, a platoon management control system and method uses a combination of GPS data and information relating to the physical characteristics of a platoon vehicle pair and their relative spacing to encode and decode deceleration command signals exchanged therebetween. The deceleration command signals are verified in accordance with a correspondence of encryption results between the sending and receiving platooning vehicles.

In accordance with another aspect, a platoon management control system and method uses the GPS position of the rear of the lead vehicle. The deceleration demand from the lead vehicle is overlaid upon the position of the rear of the lead vehicle. The following vehicle uses the GPS position of the following vehicle along with the radar or vision system of the following vehicle to determine the rear of the lead vehicle. When a deceleration signal from the lead vehicle is subtracted from the position of the rear of the forward vehicle as determined by the following vehicle, the deceleration profile must be within an acceptable window. In this manner, an external source (hacker) would need to know the vehicle characteristics of both vehicles to send a valid deceleration demand.

In accordance with yet another aspect, a platoon management control system and method uses one or more local sensors on adjacent platooning vehicles to communicate encoding scheme selection information and also to communicate the deceleration command signals. This permits the following vehicle to decode the deceleration command signals using a decoding scheme corresponding to the encoding scheme indicated as being used by the leading vehicle. This also permits the following vehicle to validate the deceleration command signals as being from the leading vehicle indicating the scheme in accordance with a comparison the of the decoded result with a value stored in a memory.

In yet another aspect, a platoon management control system and method uses a key broadcast from a forward vehicle independent of V2V communication. For example, the brake controller of the lead vehicle may flash the brake lights in a specific manner at some point prior to the deceleration demand. The deceleration demand from the lead vehicle to the following vehicle would be overlaid upon a profile. The signal would be considered valid if the deceleration profile received by the following vehicle brake controller is within acceptable criteria.

In accordance with an example embodiment, a system is provided for determining authenticity of a deceleration command signal received by an associated following vehicle from an associated leading vehicle of a platooning vehicle pair comprising the leading and following vehicles cooperatively travelling seriatim as a platoon along an associated roadway. The system of the example embodiment includes a platoon control unit configured to be disposed in the associated following vehicle of the platooning vehicle pair, a communication receiver operatively coupled with the platoon control unit, a global position sensor (GPS) receiver operatively coupled with the platoon control unit, and a sensor operatively coupled with the platoon control unit and being configured to be disposed in the associated following vehicle.

The platoon control unit comprises a processor, a non-transient memory device operatively coupled with the processor, and logic stored in the non-transient memory and executable by the processor to determine authenticity of deceleration command signals.

The receiver is operable to receive deceleration command and first verification signals from the associated leading vehicle of the platooning vehicle pair. The deceleration command signal comprises deceleration command data selectively usable by the associated following vehicle to effect a deceleration operation of the associated following vehicle. The first verification signal comprises first verification data representative of an encryption by an associated platoon control unit of the associated leading vehicle of deceleration command data in accordance with an encryption algorithm.

The GPS receiver is operable to receive a global position signal from an associated source of global position information. The global position signal comprises global position data, the global position data being representative of a position of the associated following vehicle relative to the associated roadway.

The sensor is operable to sense a relative position between the associated following vehicle and the associated leading vehicle, and generate relative distance data representative of the sensed relative position between the associated following vehicle and the associated leading vehicle.

In the example embodiment, the logic of the platoon control unit is executable by the processor to generate collective operational command data in accordance with a predetermined combination of the global position data, the relative distance data, and the deceleration command data. The logic of the platoon control unit is further executable by the processor to selectively determine authenticity of the deceleration command signal in accordance with a result of a comparison between the collective operational command data and the first verification data.

In accordance with an example embodiment, a method is provided for determining authenticity of a deceleration command signal received by an associated following vehicle from an associated leading vehicle of a platooning vehicle pair comprising the leading and following vehicles cooperatively travelling seriatim as a platoon along an associated roadway. The method of the example embodiment includes providing a platoon control unit in the associated following vehicle of the platooning vehicle pair, wherein the platoon control unit includes a processor, a non-transient memory device operatively coupled with the processor, and logic stored in the non-transient memory and executable by the processor to determine authenticity of deceleration command signals.

The method includes receiving by an associated communication receiver operatively coupled with the platoon control unit, deceleration command and first verification signals from the associated leading vehicle of the platooning vehicle pair. The deceleration command signal comprises deceleration command data selectively usable by the associated following vehicle to effect a deceleration operation of the associated following vehicle. The first verification signal received from the associated leading vehicle of the platooning vehicle pair comprises first verification data representative of an encryption by an associated platoon control unit of the associated leading vehicle of deceleration command data in accordance with an encryption algorithm.

The method of the example embodiment further includes receiving a global position signal by an associated global position sensor receiver operatively coupled with the platoon control unit. The global position signal is received from an associated source of global position information and comprises global position data. The global position data is representative of a position of the associated following vehicle relative to the associated roadway.

The method of the example embodiment further includes using an associated sensor operatively coupled with the platoon control unit and being configured to be disposed in the associated following vehicle to sense a relative position between the associated following vehicle and the associated leading vehicle, and generate relative distance data representative of the sensed relative position between the associated following vehicle and the associated leading vehicle.

The method of the example embodiment further includes executing the logic of the platoon control unit by the processor to generate collective operational command data in accordance with a predetermined combination of the global position data, the relative distance data, and the deceleration command data; and selectively determine authenticity of the deceleration command signal in accordance with a result of a comparison between the collective operational command data and the first verification data.

In accordance with yet a further example embodiment, a system is provided for determining authenticity of a deceleration command signal received by an associated following vehicle from an associated leading vehicle of a platooning vehicle pair comprising the leading and following vehicles cooperatively travelling seriatim as a platoon along an associated roadway. In accordance with the example embodiment, the system includes a platoon control unit configured to be disposed in the associated following vehicle of the platooning vehicle pair, and first and second sensors operatively coupled with the platoon control unit and being configured to be disposed in the associated following vehicle.

The platoon control unit of the example embodiment includes a processor, a non-transient memory device operatively coupled with the processor, and logic stored in the non-transient memory and executable by the processor to determine authenticity of deceleration command signals.

The first sensor of the example embodiment is operable to receive a first key verification signal from the associated leading vehicle of the platooning vehicle pair, the first key verification signal comprising first key verification data representative of a first encoding scheme selected by an associated platoon control unit of the associated leading vehicle used in generating by the associated leading vehicle an encoded deceleration command signal in accordance with the selected first encoding scheme. The first sensor of the example embodiment is operable to receive the encoded deceleration command signal from the associated leading vehicle of the platooning vehicle pair, the encoded deceleration command signal comprising proffered deceleration command data selectively usable by the associated following vehicle to effect a deceleration operation of the associated following vehicle.

In the example embodiment, the logic of the platoon control unit is executable by the processor to select a first decoding scheme in accordance with the first key verification data from the first key verification signal, and to apply the selected first decoding scheme to the encoded deceleration command signal (Decel_Sig) to obtain potential deceleration command data. The logic of the platoon control unit is further executable by the processor to compare the potential deceleration command data with a predetermined threshold criteria to selectively determine the potential deceleration command data to be the authentic deceleration command data in accordance with a result of the comparing.

In accordance with yet a further example embodiment, a method is provided for determining authenticity of a deceleration command signal received by an associated following vehicle from an associated leading vehicle of a platooning vehicle pair comprising the leading and following vehicles cooperatively travelling seriatim as a platoon along an associated roadway. The method of the further example embodiment includes providing a platoon control unit in the associated following vehicle of the platooning vehicle pair, wherein the platoon control unit includes a processor, a non-transient memory device operatively coupled with the processor, and logic stored in the non-transient memory and executable by the processor to determine authenticity of deceleration command signals.

The method of the further example embodiment includes receiving by a first sensor operatively coupled with the platoon control unit receive a first key verification signal from the associated leading vehicle of the platooning vehicle pair, the first key verification signal comprising first key verification data representative of a first encoding scheme selected by an associated platoon control unit of the associated leading vehicle used in generating by the associated leading vehicle an encoded deceleration command signal in accordance with the selected first encoding scheme; and The method of the further example embodiment includes receiving by a second sensor operatively coupled with the platoon control unit the encoded deceleration command signal from the associated leading vehicle of the platooning vehicle pair, the encoded deceleration command signal comprising proffered deceleration command data selectively usable by the associated following vehicle to effect a deceleration operation of the associated following vehicle.

The method of the further example embodiment includes executing the logic of the platoon control unit by the processor to select a first decoding scheme in accordance with the first key verification data from the first key verification signal.

The method of the further example embodiment includes executing the logic of the platoon control unit by the processor to apply the selected first decoding scheme to the encoded deceleration command signal to obtain potential deceleration command data.

The method of the further example embodiment includes executing the logic of the platoon control unit by the processor to compare the potential deceleration command data with a predetermined threshold criteria to selectively determine the potential deceleration command data to be the authentic deceleration command data in accordance with a result of the comparing.

Other embodiments, features and advantages of the example embodiments for radar based anti-hacking deceleration control and for determining authenticity of command signals such as deceleration command signals for example will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 9a is a chart showing a first example waveform profile and a deceleration command signal encoded using the first example waveform profile.

FIG. 9b is a chart showing the deceleration command signal decoded using the first example waveform profile of FIG. 9a.

FIG. 10a is a chart showing a second example waveform profile and a deceleration command signal encoded using the second example waveform profile.

FIG. 10b is a chart showing the deceleration command signal decoded using the second example waveform profile of FIG. 10a.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
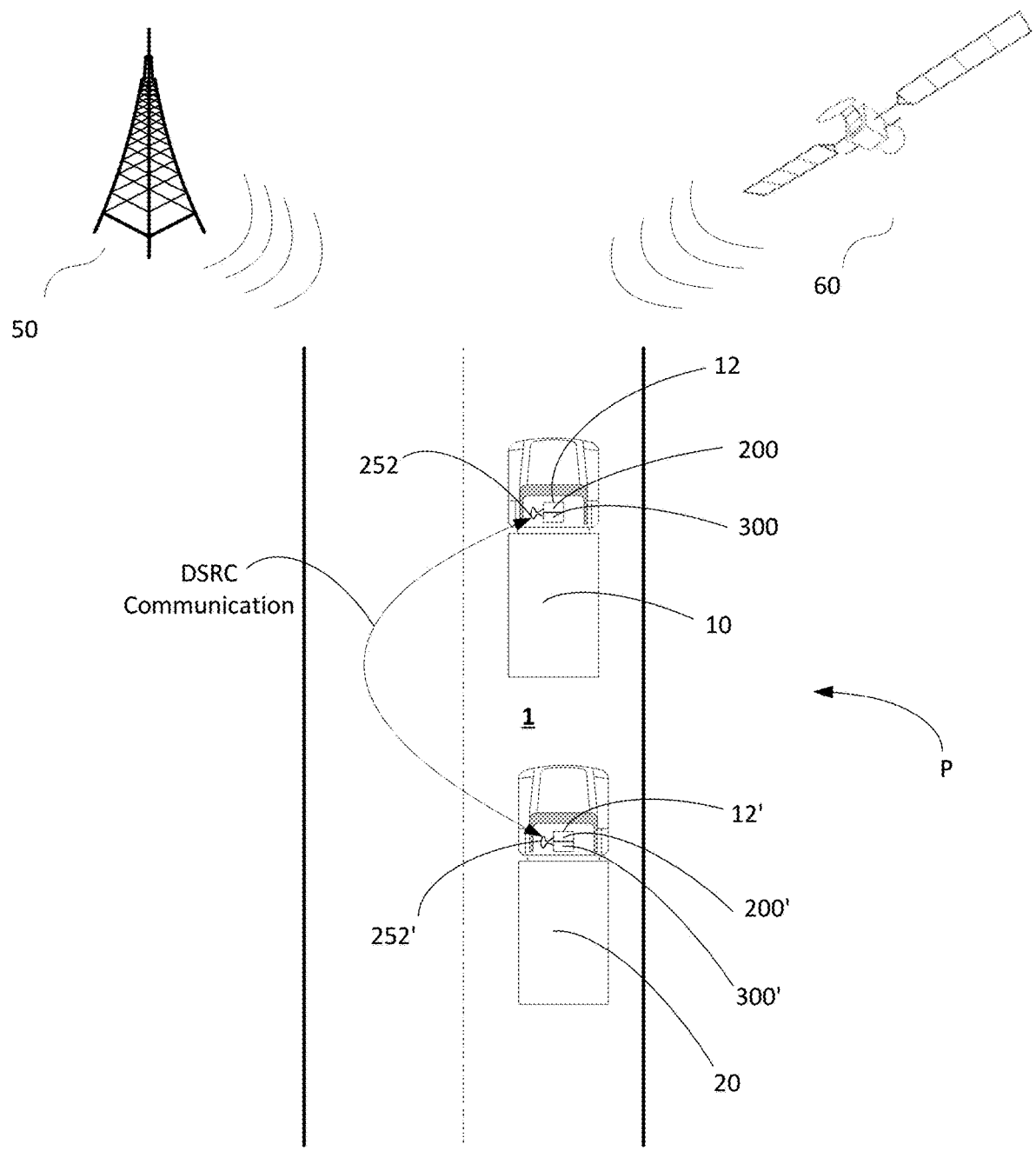
FIG. 1 depicts operation of an exemplary platoon in accordance with the embodiments.

Referring now to the drawings, wherein the showings are for the purpose of illustrating the example embodiments for platoon initialization, redundant lane departure control, and redundant communication operation only, and not for purposes of limiting the same, FIG. 1 illustrates a basic platoon P including a host or leader vehicle 10 in traffic with a second or follower vehicle 20 in accordance with the present disclosure. As shown, the follower vehicle 20 is traveling proximate to the leader vehicle 10 in an ordered platoon P along a roadway 1. In the example embodiment shown, the follower vehicle 20 is traveling proximate to the leader vehicle 10 seriatim along the roadway 1 in the example platoon P. However, it is to be appreciated that the platoon P can take on any arrangement of vehicle conformation in accordance with further embodiments. The leader vehicle 10 is provided with an electronic control system 12 which includes a data collection and communication module portion 200 (FIG. 2) and a platooning control portion 300 (FIG. 3) to be described in greater detail below. Similarly, the follower vehicle 20 is also provided with an electronic control system 12' which includes a data collection and communication module portion 200' similar to the data collection and communication module portion 200 of the leader vehicle 10, and a platooning control portion 300' similar to the platooning control portion 300 of the leader vehicle 10. In the example embodiments to be described herein, each of the two or more vehicles comprising the various platoons that will be described include the same or equivalent electronic control system 12, the same or equivalent data collection and communication module portion 200, and the same or equivalent platooning control portion 300. However, it is to be appreciated that other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to inter-vehicle platoon distance and/or spacing management i.e. platoon ordering and spacing beneficially without the need to consult with or act under the direction of or in concert with the remote wireless communication system 50, the remote satellite system 60, the remote fleet management facility, a Network Operations Center (NOC), a Central Command Center (CCC), or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for self-ordering and spacing into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
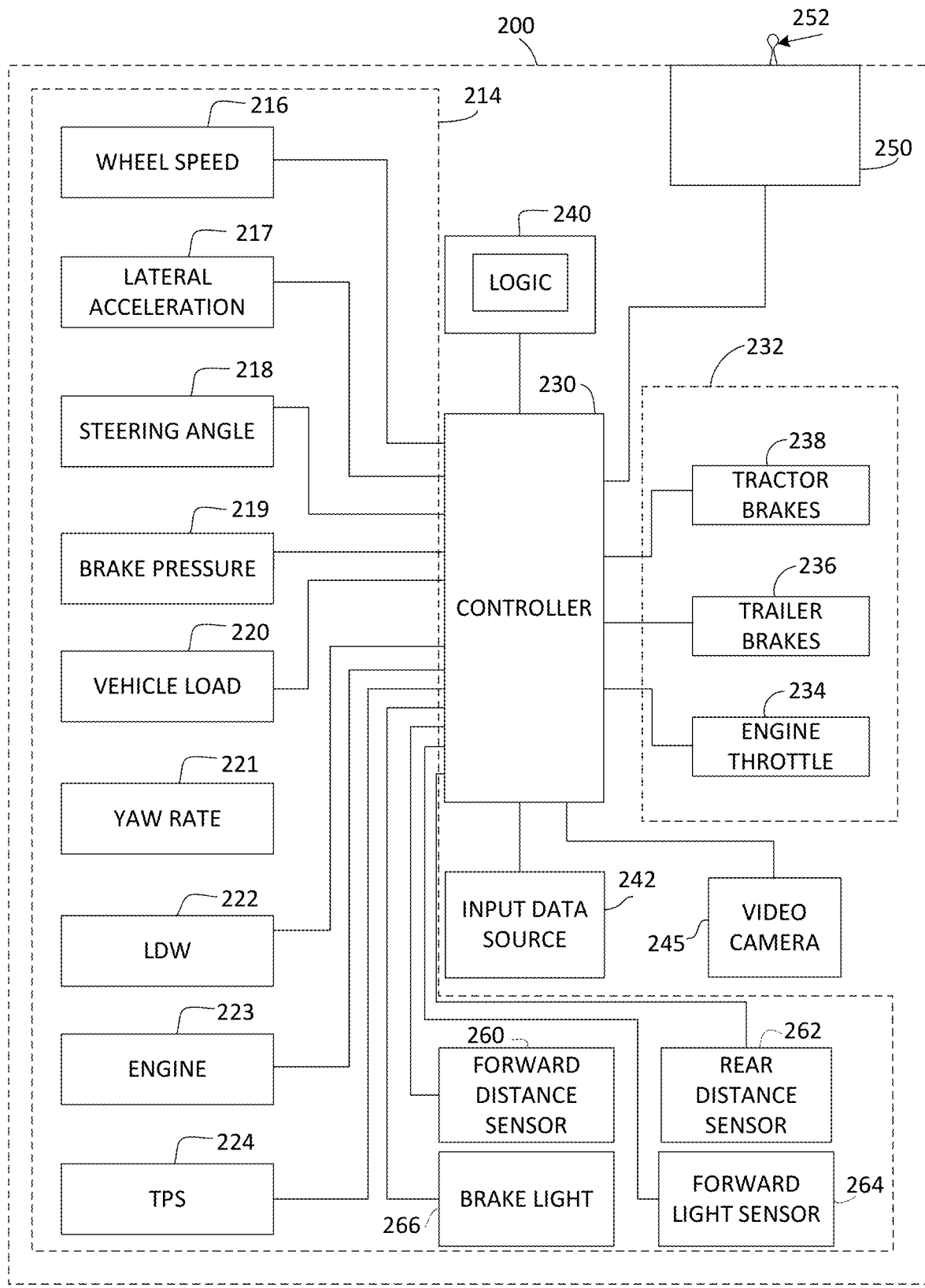
FIG. 2 is a schematic illustration of an exemplary embodiment of a data collection and communication module portion of the subject sensor-based anti-hacking and prevention system according to the example embodiment.

With reference next to FIG. 2, a schematic representation of a data collection and communication module portion 200 of the subject system for new and improved systems and methods for platoon initialization for rearrangement of vehicles into regular, such as columnar for example, formations, for redundant lane departure control, and for redundant communication operation according to principles of the example embodiment is illustrated. Other vehicle arrangements for platooning are possible according to principles of the example embodiments including for example non-columnar formation, V-shaped formations, and others for example. The data collection and communication module 200 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, and a tire pressure (TPMS) monitoring system 224. The data collection and communication module 200 may also utilize additional devices or sensors in the exemplary embodiment including for example a forward distance sensor 260, a rear distance sensor 262, one or more rear lights such as a primary rear brake light 266, a forward light sensor 264, and an Infrared (IR) light 223. Other sensors and/or actuators or energy generation devices or combinations thereof may be used of otherwise provided as well, and one or more devices and/or sensors may be combined into a single unit as may be necessary and/or desired.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value and/or to one or more others signal and/or data. The controller 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. The controller 230 may send the control signal to selectively activate the brake light 266 for reasons to be described below including for example to communicate information to following vehicles as may be deemed necessary or desired. In a tractor-trailer arrangement, the controller 230 may engage the brakes on one or more wheels of a trailer portion of the vehicle 236 and the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The controller 230 may also include a memory portion 240 for storing and accessing system information, such as for example the system control logic and control tuning. The memory portion 240, however, may be separate from the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix ESP® system may utilize some or all of the sensors described in FIG. 2. The logic component of the Bendix® ESP® system resides on the vehicle's antilock brake system electronic control unit, which may be used for the controller 230 of the present invention. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The data collection and communication module 200 may also include a source of input data 242 for receiving data indicative of a configuration/condition of a commercial vehicle, data indicative of environmental conditions around the vehicle, or the like. The controller 230 may sense or estimate the configuration/condition and/or the environmental conditions around the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 245 representation of one or more physical video cameras disposed on the vehicle such as, for example, one video camera on each corner of the vehicle.

Still yet further, the data collection and communication module 210 may also include a transmitter/receiver (transceiver) module 250 such as, for example, a radio frequency (RF) transmitter including one or more antennas 252 for wireless communication of GPS data, one or more various vehicle configuration and/or condition data, or the like between the vehicles and one or more destinations such as, for example, to one or more wireless services 50, 60 (FIG. 1) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The controller 230 is operative to communicate the acquired data to the one or more receivers in a raw data form, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 218 may be combined with the data from the steering angle sensor 220 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 3:
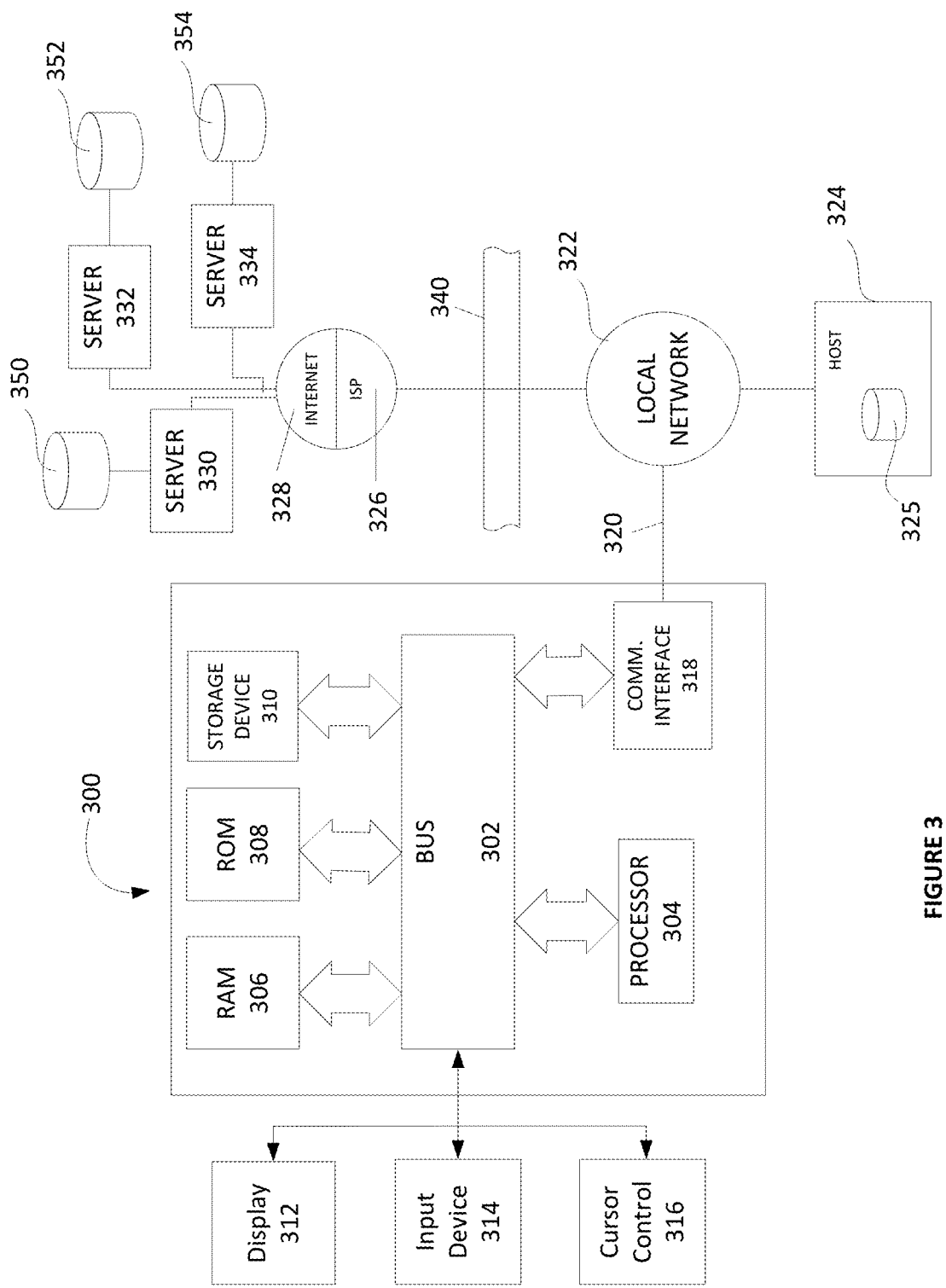
FIG. 3 is a block diagram that illustrates a sensor-based anti-hacking computer system suitable for executing embodiments of one or more software systems or modules that perform fleet management and methods of monitoring and reporting hacked control signals according to the example embodiment.

FIG. 3 is a block diagram that illustrates a platoon control computer system 300 suitable for executing embodiments of one or more software systems or modules that perform platoon initialization, redundant lane departure control, redundant communication operation, and fleet management and control according to the subject application. The controller 230 of FIG. 2 may be in an example embodiment provided as the computer system 300 illustrated, for example. The example system 300 of the embodiment includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon sensor-based anti-hacking prevention computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon self-ordering computer system 300, are exemplary forms of carrier waves transporting the information.

The platoon sensor-based anti-hacking prevention computer system 300 can send messages and receive data, including program code, through the network(s), network link 320 and communication interface 318. In the Internet-connected example embodiment, the platoon sensor-based anti-hacking prevention computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The platoon sensor-based anti-hacking prevention computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although platoon sensor-based anti-hacking prevention computer system 300 is shown in FIG. 3 as being connectable to a set of three (3) servers, 330, 332, and 334, those skilled in the art will recognize that platoon sensor-based anti-hacking prevention computer system 300 may establish connections to multiple additional servers on Internet 328. Each such server in the example embodiments includes HTTP-based Internet applications, which may provide information to platoon sensor-based anti-hacking prevention computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon sensor-based anti-hacking prevention computer system 300 suitably includes several subsystems or modules to perform the anti-hacking detection and prevention management as set forth herein. A primary purpose of the subject application is to provide an improved intuitive and convenient user interface which allows a user to select parameters for performing anti-hacking detection and prevention, and to make adjustments of the parameters based on the result presentation as necessary or desired.

Figure 4:
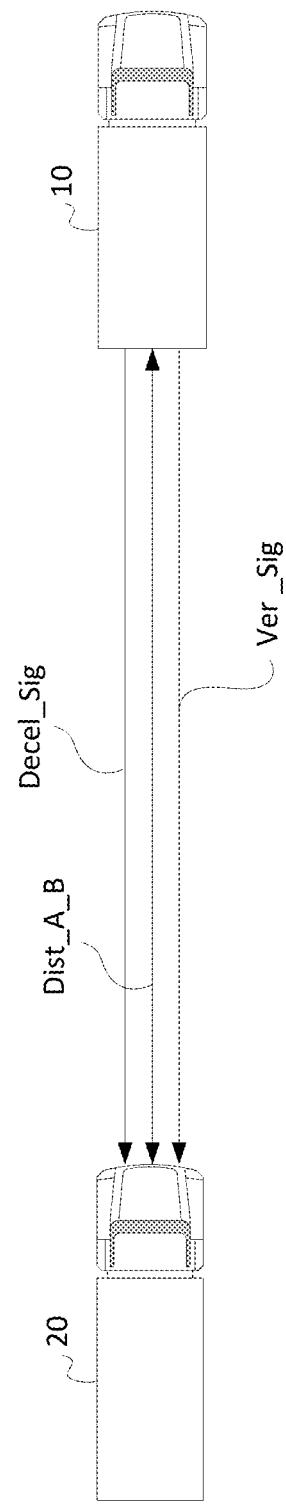
FIG. 4 is a schematic illustration of a deceleration command signal and a verification signal being communicated from a first platooning vehicle physically ahead of a second platooning vehicle physically behind the first vehicle for sensor-based anti-hacking in accordance with a first embodiment.

FIG. 4 is a schematic illustration of a deceleration command signal and a verification signal being communicated from a first platooning vehicle physically ahead of a second platooning vehicle physically behind the first vehicle for sensor-based anti-hacking in accordance with a first embodiment. With reference now to that Figure, in general, the leading vehicle 10 of a platooning vehicle pair comprising the leading 10 and following 20 vehicles cooperatively travelling seriatim as a platoon P long an associated roadway may send to the following vehicle 20 a deceleration command signal (Decel_Sig) and a first verification signal (Ver_Sig). In accordance with the example embodiment, the deceleration command signal (Decel_Sig) is directly usable by the following vehicle 10 as is and without modification or transformation to effect a deceleration demand contained within the deceleration command signal (Decel_Sig). However and also in accordance with the example embodiment, the deceleration command signal (Decel_Sig) is accompanied by the first verification signal (Ver_Sig) from leading vehicle for purposes of allowing the sensor based anti-hacking of the example embodiment to determine the validity of the deceleration command signal (Decel_Sig) as being from the leading vehicle 10. Preferably, the validity of the deceleration command signal (Decel_Sig) is determined before the deceleration demand contained within the deceleration command signal (Decel_Sig) is effected.

In the example embodiment illustrated, the deceleration command signal (Decel_Sig) received from the leading vehicle 10 of the platooning vehicle pair PP includes or otherwise contains deceleration command data (Decel_Data) selectively usable by the following vehicle 20 to effect a deceleration operation of the following vehicle 20 in accordance with the deceleration command data Decel_Data. Further in accordance with the example embodiment illustrated, the deceleration command signal (Decel_Sig) received from the leading vehicle 10 of the platooning vehicle pair PP includes or otherwise contains first verification data (Ver_Data) representative of an encryption by a platoon control unit of the leading vehicle 10 of deceleration command data (Decel_Data) in accordance with an encryption algorithm. The first verification data Ver_Data is selectively usable by the following vehicle 20 to determine the validity of the deceleration command signal (Decel_Sig) as being from the leading vehicle 10 in accordance with the example embodiment and in a manner to be described in greater detail below.

With continued reference to FIG. 4 together with the showings of FIGS. 2 and 3, a communication receiver operatively coupled with the platoon control unit of the following vehicle 20 is operable to receive the deceleration command signal (Decel_Sig) and the first verification signal (Ver_Sig) from the leading vehicle 10 of the platooning vehicle pair PP. In addition, a global position sensor (GPS) receiver operatively coupled with the platoon control unit of the following vehicle 20 is operable to receive a global position signal (GPS_Sig) from an associated source of global position information such as, for example, from the remote wireless communication system 50 and/or the remote satellite system 60 shown in FIG. 1. The global position signal comprises global position data (GPS_Data) representative of a position of the following vehicle 20 relative to the associated roadway 1 shared with the leading vehicle.

A sensor 260 is disposed on the following vehicle. Preferably, the sensor is a forward physical distance sensor for determining a relative distance between the leading 10 and following 20 vehicles. The sensor is operatively coupled with the platoon control unit and is configured to be disposed on the front of the following vehicle 20 oriented towards the leading vehicle 10. In the example embodiment, the sensor 260 is operable to sense a relative position between the following vehicle 20 and the leading vehicle 10, and to generate relative distance data (Dist_A_B) representative of the sensed relative position between the following vehicle 20 and the leading vehicle 10.

The logic of the platoon control unit 12' of the following vehicle 20 is executable by the processor to generate collective operational command data (Op_Cmd_Data) in accordance with a predetermined combination of the global position data (GPS_Data), the relative distance data (Dist_A_B), and the deceleration command data (Decel_Data). In addition, the logic of the platoon control unit 12' of the following vehicle 20 is executable by the processor to selectively determine authenticity of the deceleration command signal (Decel_Sig) in accordance with a result of a comparison between the collective operational command data (Op_Cmd_Data) and the first verification data (Ver_Data).

Preferably and in a manner to be described in greater detail below, the logic of the platoon control unit 12' of the following vehicle 20 determines the deceleration command signal (Decel_Sig) to be authentic in accordance with a matching result of the comparison between the collective operational command data (Op_Cmd_Data) and the first verification data (Ver_Data). Also preferably, the logic of the platoon control unit 12' of the following vehicle 20 determines the deceleration command signal (Decel_Sig) to be inauthentic in accordance with a mis-matching result of the comparison between the collective operational command data (Op_Cmd_Data) and the first verification data (Ver_Data).

The platoon control unit of the following vehicle 20 is further operative to generate a deceleration demand signal (Decel_Demand_Sig) responsive to determining the deceleration command signal (Decel_Sig) to be authentic. In the example embodiment, the deceleration demand signal (Decel_Demand_Sig) may be selectively used by the following vehicle 20 to manage participation in the platoon P together with the leading vehicle 10 by initiating a deceleration in accordance with the deceleration command data (Decel_Data)) received from the leading vehicle 10.

Figure 5A:
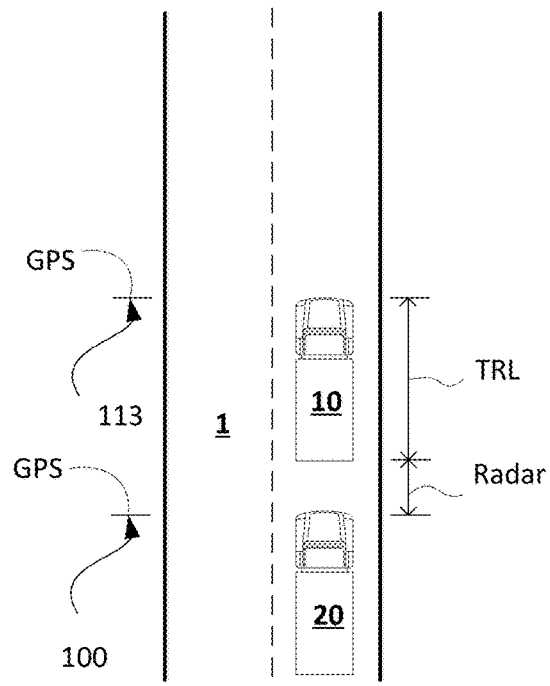
FIGS. 5a-5d are schematic illustrations of the first and second platooning vehicles of FIG. 4 showing sequential movement representations of physical and other data used by the first and second platooning vehicles for verifying or otherwise determining validity of the deceleration command signal for hacking prevention according to the first example embodiment of FIG. 4.
Figure 5B:
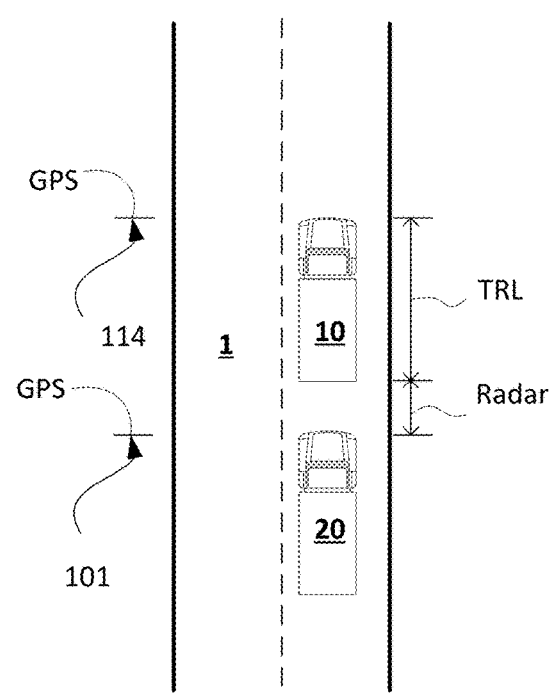
Figure 5C:
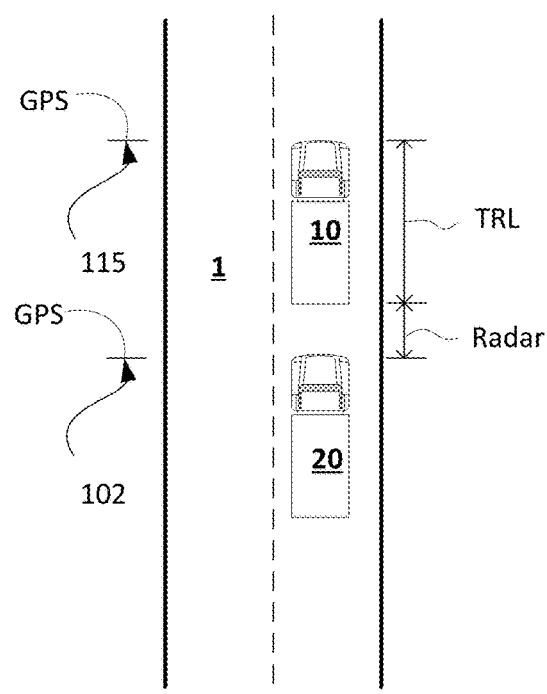

FIGS. 5a-5c are schematic illustrations of the first and second platooning vehicles of FIG. 4 showing sequential movement representations of physical and other data used by the first and second platooning vehicles for verifying or otherwise determining validity of the deceleration command signal for hacking prevention according to the first example embodiment of FIG. 4.

FIGS. 5a-5c will be used with reference to Tables I and II below for describing a numerical example of the embodiment. As noted, the leading 10 and following 20 vehicles cooperatively travel seriatim as a platoon P along an associated roadway 1. To that end, the platoon P progresses along the roadway from the position shown in FIG. 5a, then to the position shown in FIG. 5b, then to the position shown in FIG. 5c, then to the position shown in FIG. 5c.

With reference first to the example data contained in Table I below, the leading vehicle 10 determines its own GPS position to be 113 when at the location along the roadway illustrated in FIG. 5a, to be 114 when at the location along the roadway illustrated in FIG. 5b, to be 115 when at the location along the roadway illustrated in FIG. 5c, and to be 116 when at the location along the roadway illustrated in FIG. 5d. In the numerical example, the leading vehicle 10 has a physical trailer length of "3" and also the leading vehicle issues a deceleration Demand of "−4" in each of the examples. Accordingly, the deceleration command signal Decel_Sig sent from the leading vehicle 10 comprises deceleration command data Decel_Data of "−4" selectively usable by the following vehicle 20 to effect a deceleration operation of the associated following vehicle 20.

However, in order to provide the following vehicle 20 with an assurance that the deceleration command signal Decel_Sig is valid, the leading vehicle generates a further signal Ver_Sig comprising verification data Ver_Data in accordance with a weighted sum combination of the global position data GPS with deceleration command data Demand of the leading vehicle 10 and physical characteristic data Phys_B_Data representative of a physical length characteristic of the leading vehicle. In the example, the physical characteristic data Phys_B_Data is a length "3" of the trailer of the leading vehicle 10. In the example the weighting factor is "1" for all of the parameters, but any one or more weighting factor(s) could equivalently be used as may be necessary or desired.

As shown in Table I below, the verification data determined by the control unit of the leading vehicle and incorporated into the verification signal sent to the following vehicle 20 at the location shown in FIG. 5a is 106. Similarly, the verification data determined by the control unit of the leading vehicle and incorporated into the verification signal sent to the following vehicle 20 at the location shown in FIG. 5b is 107. The verification data determined by the control unit of the leading vehicle and incorporated into the verification signal sent to the following vehicle 20 at the location shown in FIG. 5c is 108. Lastly in the example, the verification data determined by the control unit of the leading vehicle and incorporated into the verification signal sent to the following vehicle 20 at the location shown in FIG. 5d is 109.

TABLE I

Leading Vehicle

Figure 5D:
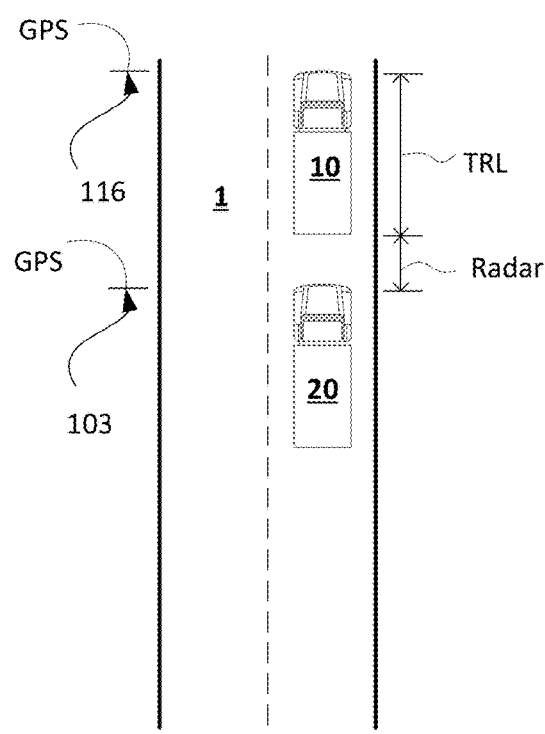

| Location | GPS | TRL | Demand | Ver_Data |
|---|---|---|---|---|
| FIG. 5a | 113 | 3 | −4 | 113 − 3 − 4 = 106 |
| FIG. 5b | 114 | 3 | −4 | 114 − 3 − 4 = 107 |
| FIG. 5c | 115 | 3 | −4 | 115 − 3 − 4 = 108 |
| FIG. 5d | 116 | 3 | −4 | 116 − 3 − 4 = 109 |

Although the deceleration command signal Decel_Sig sent from the leading vehicle 10 comprises deceleration command data Decel_Data of "−4" is directly usable by the following vehicle 20 to effect a deceleration operation, the following vehicle 20 uses the verification data Ver_Data contained in the verification signal Ver_Sig sent fro the leading vehicle in order to provide the following vehicle 20 with an assurance that the deceleration command signal Decel_Sig is valid and originating from the leading vehicle 10. To that end, and with continued reference to FIGS. 5a-5d and to Table II below, the forward distance or radar sensor on the following vehicle 20 and operatively coupled with the control unit of the following vehicle is operable to sense a relative position between the following vehicle 20 and the leading vehicle, and to generate relative distance data Dist_A_B representative of the sensed relative position between the following vehicle 20 and the leading vehicle 10. The relative distance between the leading and following vehicles as sensed by the radar of the following vehicle a "10" in each of the locations shown in FIGS. 5a-5d as shown in Table II below in column "Radar."

In addition, the following vehicle 20 determines its own GPS position to be 100 when at the location along the roadway illustrated in FIG. 5a, to be 101 when at the location along the roadway illustrated in FIG. 5b, to be 102 when at the location along the roadway illustrated in FIG. 5c, and to be 103 when at the location along the roadway illustrated in FIG. 5d.

The logic of the platoon control unit in the following vehicle 20 is executable by the processor to generate collective operational command data Op_Cmd_Data in accordance with a predetermined combination of the global position data GPS, the relative distance data Radar, and the deceleration command data Demand. In the example embodiment the combination of the global position data GPS, the relative distance data Radar, and the deceleration command data Demand is a weighted sum of these values, wherein the weights assigned to each parameter is one (1) although one or more weights may be used as necessary or desired.

As shown in Table II below, the verification data determined by the control unit of the following vehicle 20 at the location shown in FIG. 5a is 106. Similarly, the verification data determined by the control unit of the following vehicle at the location shown in FIG. 5b is 107. The verification data determined by the control unit of the following vehicle at the location shown in FIG. 5c is 108. Lastly in the example, the verification data determined by the control unit of the following vehicle 20 at the location shown in FIG. 5d is 109. The logic of the platoon control unit of the following vehicle 20 is executable by the processor to selectively determine authenticity of the deceleration command signal (Decel_Sig) in accordance with a result of a comparison between the collective operational command data (Op_Cmd_Data) and the first verification data (Ver_Data).

As shown in Table II below the collective operational command data (Op_Cmd_Data) matches the first verification data (Ver_Data) at each of the locations shown in FIGS. 5a-5d wherein the logic of the platoon control unit of the following vehicle 20 determines the deceleration command signal (Decel_Sig) to be authentic at each of those locations.

TABLE II

Following Vehicle

| Location | GPS | Radar | Demand | Op_Cmd_Date |
|---|---|---|---|---|
| FIG. 5a | 100 | 10 | −4 | 100 + 10 − 4 = 106 |
| FIG. 5b | 101 | 10 | −4 | 101 + 10 − 4 = 107 |
| FIG. 5c | 102 | 10 | −4 | 102 + 10 − 4 = 108 |
| FIG. 5d | 103 | 10 | −4 | 103 + 10 − 4 = 109 |

Figure 6:
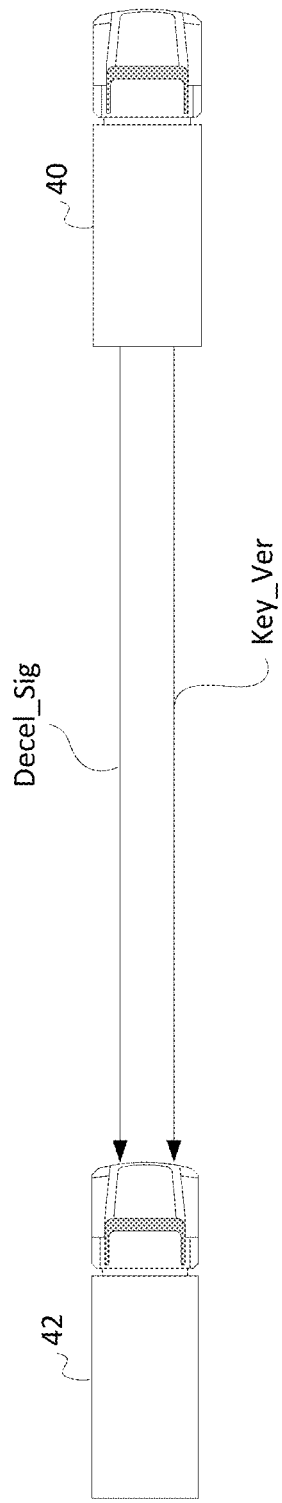
FIG. 6 is a schematic illustration of a deceleration command signal and a key verification signal being communicated from sensors on the first platooning vehicle physically ahead of the second platooning vehicle physically behind the first vehicle for sensor-based anti-hacking in accordance with a second embodiment.

FIG. 6 is a schematic illustration of a deceleration command signal Decel_Sig and a key verification signal Key_Ver being communicated from sensors on the first platooning vehicle physically ahead of the second platooning vehicle physically behind the first vehicle for sensor-based anti-hacking in accordance with a second embodiment. In accordance with the example embodiment, a platoon management control system and method uses one or more local sensors on adjacent platooning vehicles to communicate encoding scheme selection information and also to communicate the deceleration command signals. This permits the following vehicle to decode the deceleration command signals using a decoding scheme corresponding to the encoding scheme indicated as being used by the leading vehicle. This also permits the following vehicle to validate the deceleration command signals as being from the leading vehicle indicating the scheme in accordance with a comparison the of the decoded result with a value stored in a memory.

Figure 7:
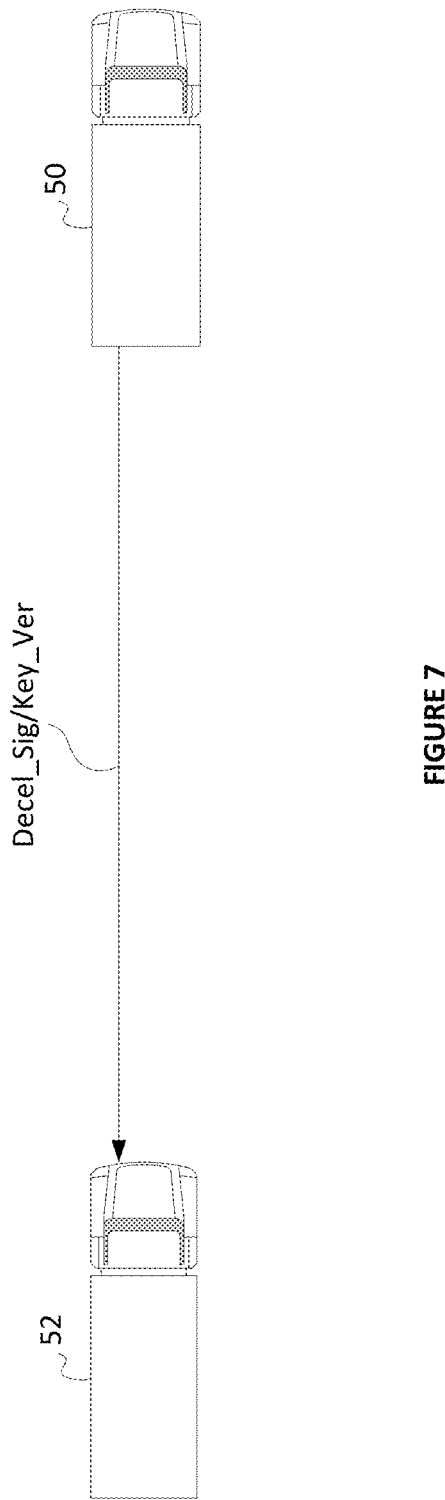
FIG. 7 is a schematic illustration of a deceleration command signal and a key verification signal being communicated from a single sensor on the first platooning vehicle physically ahead of the second platooning vehicle physically behind the first vehicle for sensor-based anti-hacking in accordance with a third embodiment.
Figure 8:
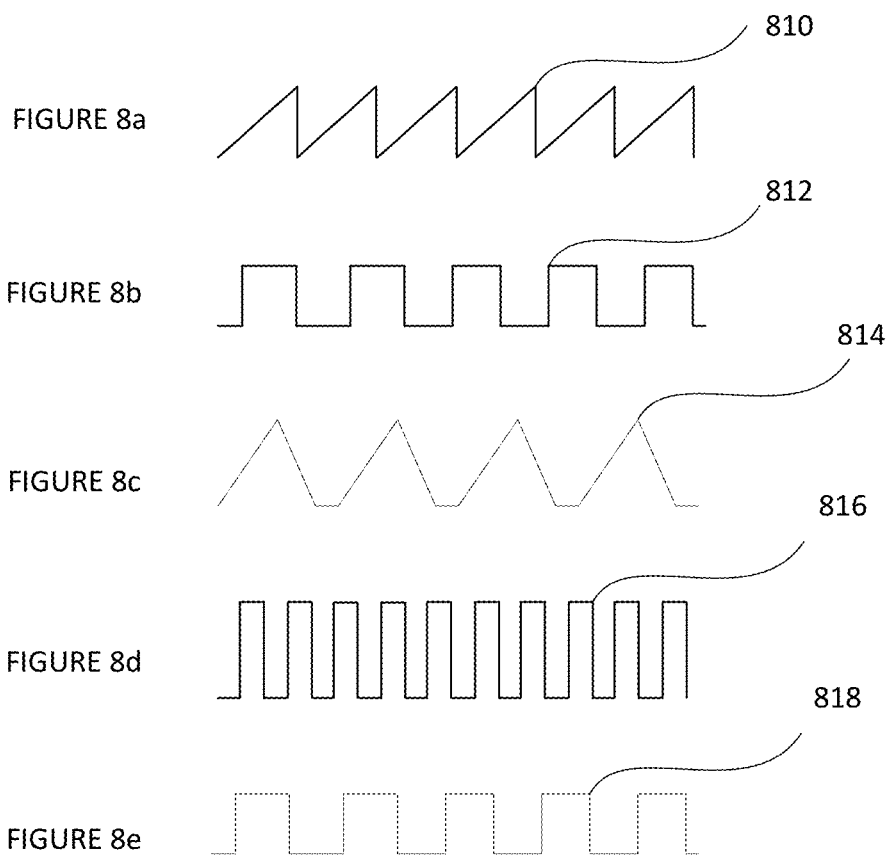
FIGS. 8a-8e are schematic illustrations of a set of example waveform profiles used overlaying deceleration command signals including deceleration demands from the lead vehicle to the following vehicle in accordance with the second and third embodiment.

FIG. 7 is a schematic illustration of the deceleration command signal Decel_Sig and the key verification signal Key_Ver being communicated from a single sensor on the first platooning vehicle physically ahead of the second platooning vehicle physically behind the first vehicle for sensor-based anti-hacking in accordance with a third embodiment. In accordance with this embodiment, a platoon management control system and method uses single local sensors on each of adjacent platooning vehicles to communicate encoding scheme selection information and also to communicate the deceleration command signals. This permits the following vehicle to decode the deceleration command signals using a decoding scheme corresponding to the encoding scheme indicated as being used by the leading vehicle. This also permits the following vehicle to validate the deceleration command signals as being from the leading vehicle indicating the scheme in accordance with a comparison the of the decoded result with a value stored in a memory.

FIGS. 8a-8e are schematic illustrations of a set of example waveform profiles used overlaying deceleration command signals including deceleration demands from the lead vehicle to the following vehicle in accordance with the second and third embodiment. FIG. 9a is a chart showing a first example waveform profile and a deceleration command signal encoded using the first example waveform profile, and FIG. 9b is a chart showing the deceleration command signal decoded using the first example waveform profile of FIG. 9a. FIG. 10a is a chart showing a second example waveform profile and a deceleration command signal encoded using the second example waveform profile, and FIG. 10b is a chart showing the deceleration command signal decoded using the second example waveform profile of FIG. 10a.

In FIG. 6, a first sensor disposed on the following vehicle 20 is operatively coupled with the platoon control 12' unit is operable to receive a first key verification signal Key_Ver from the leading vehicle 10 of the platooning vehicle pair. In the embodiment, the key verification signal Key_Ver comprises first key verification data representative of a first encoding scheme selected by the platoon control unit 12 of the leading vehicle 10 used in generating by the leading vehicle 10 an encoded deceleration command signal Decel_Sig in accordance with the selected first encoding scheme. Several encoding schemes are shown in FIGS. 8a-8e and will be described below.

A second sensor disposed on the following vehicle 20 is operatively coupled with the platoon control 12' unit is operable to receive the encoded deceleration command signal Decel_Sig from the leading vehicle 10 of the platooning vehicle pair. The encoded deceleration command signal Decel_Sig comprises in the example embodiment proffered deceleration command data Prof_Decel_Data selectively usable by the following vehicle 20 to effect a deceleration operation of the following vehicle 20.

In the example embodiment, the logic of the platoon control unit 12' is executable by the processor to select a first decoding scheme in accordance with the first key verification data derived from the first key verification signal Key_Ver. In addition, the logic of the platoon control unit 12' is further executable by the processor to apply the selected first decoding scheme to the encoded deceleration command signal Decel_Sig to obtain potential deceleration command data Decel_Data?. The potential deceleration command data Decel_Data? Is compared with a predetermined threshold criteria Criteria to selectively determine whether the potential deceleration command data Decel_Data? is authentic deceleration command data Auth_Decel_Data in accordance with a result of the comparing.

Overall then this embodiment uses a key broadcast from a forward vehicle independent of V2V communication. For example, the brake controller of the lead vehicle may flash the brake lights in a specific manner at some point prior to the deceleration demand thereby essentially notifying the following vehicle of the pattern to be used to encode the deceleration demand signal. The deceleration demand from the lead vehicle to the following vehicle would be overlaid upon a profile selected from among the profiles as shown in FIGS. 10a-10e yielding overlaid deceleration demand signals such as shown in FIGS. 9a and 10a.

In the first example, the following vehicle uses the specific manner of the flash of the brake lights to retrieve a selected profile 914 from a memory, wherein the retrieved selected profile 914 matches the profile 810 used by the leading vehicle to encode the deceleration demand. The deceleration demand contained or otherwise encoded in the overlaid deceleration demand signal is considered to be valid if the resulting decoding operation performed by the following vehicle is within acceptable criteria such as shown in FIG. 9b whereat the selected profile 914 retrieved by the following vehicle is shown subtracted from the overlaid deceleration demand signal 912 received by the following vehicle from the leading vehicle yielding a substantially constant result value 922 within a predetermined threshold criteria over time.

In a second example, the following vehicle similarly uses a specific manner of the flash of the brake lights to retrieve a selected profile 1014 from a memory, wherein the retrieved selected profile 1014 matches the profile 820 used by the leading vehicle to encode the deceleration demand. The deceleration demand contained or otherwise encoded in the overlaid deceleration demand signal is considered to be valid if the resulting decoding operation performed by the following vehicle is within acceptable criteria such as shown in FIG. 10b whereat the selected profile 1014 retrieved by the following vehicle is shown subtracted from the overlaid deceleration demand signal 1012 received by the following vehicle from the leading vehicle yielding a substantially constant result value 1022 within a predetermined threshold criteria over time.

In accordance with an example embodiment, a system is provided for determining authenticity of a deceleration command signal received by an associated following vehicle from an associated leading vehicle of a platooning vehicle pair comprising the leading and following vehicles cooperatively travelling seriatim as a platoon along an associated roadway. The system of the example embodiment includes a platoon control unit configured to be disposed in the associated following vehicle of the platooning vehicle pair, a communication receiver operatively coupled with the platoon control unit, a global position sensor (GPS) receiver operatively coupled with the platoon control unit, and a sensor operatively coupled with the platoon control unit and being configured to be disposed in the associated following vehicle.

The platoon control unit comprises a processor, a non-transient memory device operatively coupled with the processor, and logic stored in the non-transient memory and executable by the processor to determine authenticity of deceleration command signals.

The receiver is operable to receive deceleration command and first verification signals from the associated leading vehicle of the platooning vehicle pair. The deceleration command signal comprises deceleration command data selectively usable by the associated following vehicle to effect a deceleration operation of the associated following vehicle. The first verification signal comprises first verification data representative of an encryption by an associated platoon control unit of the associated leading vehicle of deceleration command data in accordance with an encryption algorithm.

The GPS receiver is operable to receive a global position signal from an associated source of global position information. The global position signal comprises global position data, the global position data being representative of a position of the associated following vehicle relative to the associated roadway.

The sensor is operable to sense a relative position between the associated following vehicle and the associated leading vehicle, and generate relative distance data representative of the sensed relative position between the associated following vehicle and the associated leading vehicle.

In the example embodiment, the logic of the platoon control unit is executable by the processor to generate collective operational command data in accordance with a predetermined combination of the global position data, the relative distance data, and the deceleration command data. The logic of the platoon control unit is further executable by the processor to selectively determine authenticity of the deceleration command signal in accordance with a result of a comparison between the collective operational command data and the first verification data.

In a further example embodiment, the logic of the platoon control unit is executable by the processor to selectively determine the deceleration command signal to be or as being authentic in accordance with a matching result of the comparison between the collective operational command data (Op_Cmd_Data) and the first verification data. The logic of the platoon control unit is further executable by the processor to selectively determine the deceleration command signal to be or as being inauthentic (not authentic) in accordance with a mis-matching result of the comparison between the collective operational command data and the first verification data.

In a further example embodiment, the platoon control unit is operative to generate a deceleration demand signal responsive to determining the deceleration command signal to be or as being authentic. The deceleration demand signal may be used by the associated following vehicle as necessary and/or desired to manage participation in the platoon together with the leading vehicle by initiating a deceleration in accordance with the deceleration command data received from the associated leading vehicle.

In a further example embodiment, the logic of the platoon control unit is executable by the processor to generate collective operational command data in accordance with a predetermined sum combination of the global position data, the relative distance data, and the deceleration command data. In this example, the logic of the platoon control unit is executable by the processor to selectively generate collective operational command data in accordance with a predetermined weighted sum combination of the global position data, the relative distance data, and the deceleration command data.

In a further example embodiment, the logic of the platoon control unit is executable by the processor to generate second verification data in accordance with a weighted sum combination of the global position data with second deceleration command data of the associated following vehicle and physical characteristic data representative of a physical length characteristic of the associated following vehicle. In this example, the system may further include a transmitter operatively coupled with the platoon control unit, wherein the transmitter is operable to convert the second verification data into a second verification signal, convert the second deceleration command data of the associated following vehicle into a second deceleration command signal, transmit the second verification signal from the associated following vehicle of the platooning vehicle pair, and transmit the second deceleration command signal from the associated following vehicle of the platooning vehicle pair.

In accordance with yet a further example embodiment, a system is provided for determining authenticity of a deceleration command signal received by an associated following vehicle from an associated leading vehicle of a platooning vehicle pair comprising the leading and following vehicles cooperatively travelling seriatim as a platoon along an associated roadway. In accordance with the example embodiment, the system includes a platoon control unit configured to be disposed in the associated following vehicle of the platooning vehicle pair, and first and second sensors operatively coupled with the platoon control unit and being configured to be disposed in the associated following vehicle.

The platoon control unit of the example embodiment includes a processor, a non-transient memory device operatively coupled with the processor, and logic stored in the non-transient memory and executable by the processor to determine authenticity of deceleration command signals.

The first sensor of the example embodiment is operable to receive a first key verification signal from the associated leading vehicle of the platooning vehicle pair, the first key verification signal comprising first key verification data representative of a first encoding scheme selected by an associated platoon control unit of the associated leading vehicle used in generating by the associated leading vehicle an encoded deceleration command signal in accordance with the selected first encoding scheme. The first sensor of the example embodiment is operable to receive the encoded deceleration command signal from the associated leading vehicle of the platooning vehicle pair, the encoded deceleration command signal comprising proffered deceleration command data selectively usable by the associated following vehicle to effect a deceleration operation of the associated following vehicle.

In the example embodiment, the logic of the platoon control unit is executable by the processor to select a first decoding scheme in accordance with the first key verification data from the first key verification signal, and to apply the selected first decoding scheme to the encoded deceleration command signal (Decel_Sig) to obtain potential deceleration command data. The logic of the platoon control unit is further executable by the processor to compare the potential deceleration command data with a predetermined threshold criteria to selectively determine the potential deceleration command data to be the authentic deceleration command data in accordance with a result of the comparing.

In accordance with the example embodiment, the logic of the platoon control unit is executable by the processor to selectively determine the potential deceleration command data to be or as being authentic in accordance with the potential deceleration command data having a substantially constant value within bounds of the predetermined threshold criteria over a predetermined time period, and to determine the potential deceleration command data to be or as being inauthentic (not authentic) in accordance with the potential deceleration command data having a substantially non-constant value within the bounds of the predetermined threshold criteria over the predetermined time period.

In a further example embodiment, the logic of the platoon control unit is executable by the processor to select a first decoding profile as the first decoding scheme in accordance with the first key verification data from the first key verification signal, and to apply the selected first decoding scheme by subtracting the first decoding profile from the encoded deceleration command signal to obtain the potential deceleration command data. In this example embodiment, the logic of the platoon control unit is executable by the processor to select the first decoding profile from among a plurality of predetermined decoding waveforms in accordance with the first key verification data from the first key verification signal.

Figure 11:
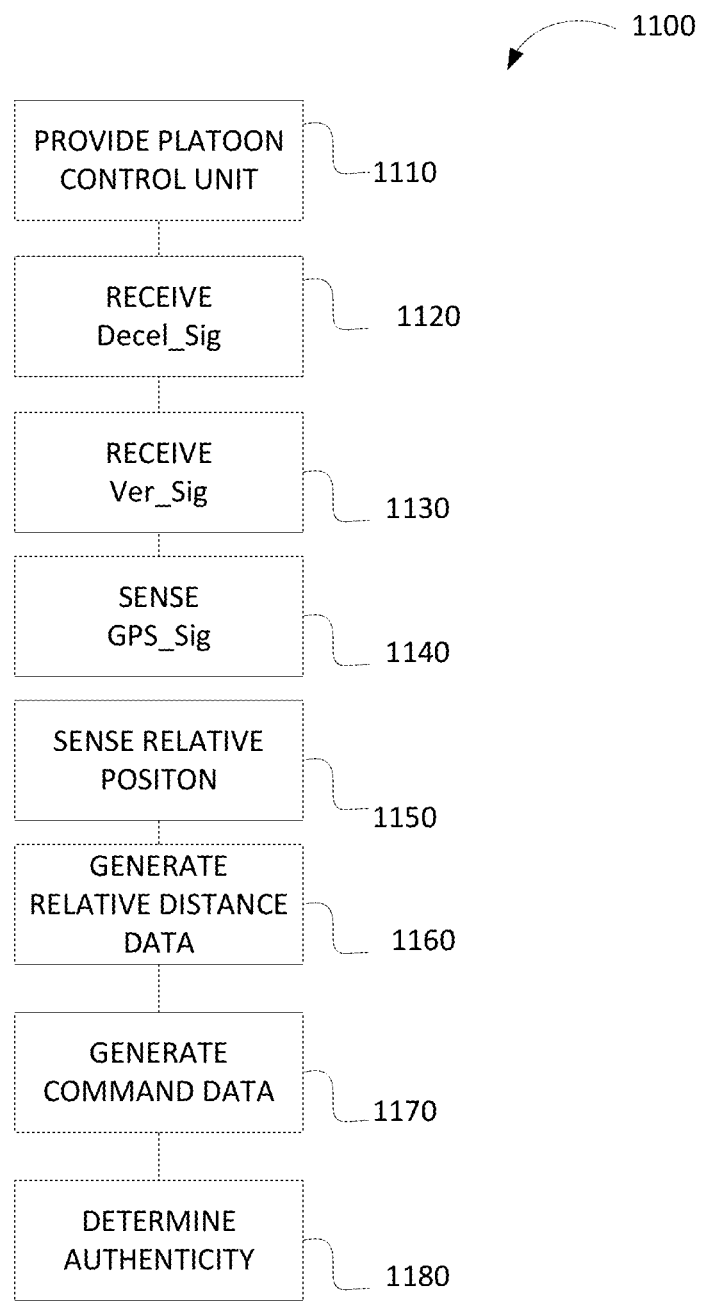
FIG. 11 is a flow diagram showing a method of determining authenticity of a deceleration command signal received by the following vehicle from the associated leading vehicle of a platooning vehicle pair cooperatively travelling seriatim as a platoon along an associated roadway in accordance with the first example embodiment of FIGS. 4 and 5a-5c.

FIG. 11 is a flow diagram showing a method 1100 of determining authenticity of a deceleration command signal received by the following vehicle from the associated leading vehicle of a platooning vehicle pair cooperatively travelling seriatim as a platoon along an associated roadway in accordance with the first example embodiment of FIGS. 4 and 5a-5c. As noted above, the electronic control system 12 is provided for communication and control functions. Logic such as software or other forms are executed by the processor of the control system 12 in order to conduct communication functionality, vehicle and driver parameter manipulation, and platoon management including, in the example embodiment, sensor-based anti-hacking prevention in platooning vehicles determining authenticity of a deceleration command signal of fleet vehicles in the platoon. although the portions of the method 1100 are illustrated as functioning serially, it is to be appreciated that the particular serial arrangement is for ease of illustration purposes only, and that the embodiments herein are not limited the exact serial execution, and may be executed in any particular order or in any combination order or in parallel by the control system or an equivalent control system as may be necessary or desired.

In one example, executable instructions associated with performing a method may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 11000. While executable instructions associated with the above method are described as being embodied as a logic encoded in one or more tangible media, it is to be appreciated that executable instructions associated with other example methods described herein may also be stored on a tangible media.

In accordance with an example embodiment, a method is provided for determining authenticity of a deceleration command signal received by an associated following vehicle from an associated leading vehicle of a platooning vehicle pair comprising the leading and following vehicles cooperatively travelling seriatim as a platoon along an associated roadway. The method of the example embodiment includes providing a platoon control unit in the associated following vehicle of the platooning vehicle pair, wherein the platoon control unit includes a processor, a non-transient memory device operatively coupled with the processor, and logic stored in the non-transient memory and executable by the processor to determine authenticity of deceleration command signals.

The method includes receiving by an associated communication receiver operatively coupled with the platoon control unit, deceleration command and first verification signals from the associated leading vehicle of the platooning vehicle pair. The deceleration command signal comprises deceleration command data selectively usable by the associated following vehicle to effect a deceleration operation of the associated following vehicle. The first verification signal received from the associated leading vehicle of the platooning vehicle pair comprises first verification data representative of an encryption by an associated platoon control unit of the associated leading vehicle of deceleration command data in accordance with an encryption algorithm.

The method of the example embodiment further includes receiving a global position signal by an associated global position sensor receiver operatively coupled with the platoon control unit. The global position signal is received from an associated source of global position information and comprises global position data. The global position data is representative of a position of the associated following vehicle relative to the associated roadway.

The method of the example embodiment further includes using an associated sensor operatively coupled with the platoon control unit and being configured to be disposed in the associated following vehicle to sense a relative position between the associated following vehicle and the associated leading vehicle, and generate relative distance data representative of the sensed relative position between the associated following vehicle and the associated leading vehicle.

The method of the example embodiment further includes executing the logic of the platoon control unit by the processor to generate collective operational command data in accordance with a predetermined combination of the global position data, the relative distance data, and the deceleration command data; and selectively determine authenticity of the deceleration command signal in accordance with a result of a comparison between the collective operational command data and the first verification data.

In accordance with a further example embodiment, the method further includes executing the logic of the platoon control unit by the processor to selectively determine the deceleration command signal to be or as being authentic in accordance with a matching result of the comparison between the collective operational command data and the first verification data, and selectively determine the deceleration command signal to be or as being inauthentic (not authentic) in accordance with a mis-matching result of the comparison between the collective operational command data and the first verification data.

In accordance with a further example embodiment, the method further includes operating the platoon control unit to generate a deceleration demand signal responsive to determining the deceleration command signal to be or as being authentic, the deceleration demand signal being used by the associated following vehicle to manage participation in the platoon together with the leading vehicle by initiating a deceleration in accordance with the deceleration command data received from the associated leading vehicle.

In accordance with a further example embodiment, the method further includes executing the logic of the platoon control unit by the processor to generate collective operational command data in accordance with a predetermined sum combination of the global position data, the relative distance data, and the deceleration command data. In this example, the method further includes executing the logic of the platoon control unit by the processor to generate collective operational command data in accordance with a predetermined weighted sum combination of the global position data, the relative distance data, and the deceleration command data.

In accordance with a further example embodiment, the method further includes executing the logic of the platoon control unit by the processor to generate second verification data in accordance with a weighted sum combination of the global position data with second deceleration command data of the associated following vehicle and physical characteristic data representative of a physical length characteristic of the associated following vehicle. In this example, the method further includes converting, by a transmitter operatively coupled with the platoon control unit, the second verification data into a second verification signal, converting by the transmitter the second deceleration command data of the associated following vehicle into a second deceleration command signal, transmitting by the transmitter the second verification signal from the associated following vehicle of the platooning vehicle pair, and transmitting by the transmitter the second deceleration command signal from the associated following vehicle of the platooning vehicle pair.

In accordance with yet a further example embodiment, a method is provided for determining authenticity of a deceleration command signal received by an associated following vehicle from an associated leading vehicle of a platooning vehicle pair comprising the leading and following vehicles cooperatively travelling seriatim as a platoon along an associated roadway. The method of the further example embodiment includes providing a platoon control unit in the associated following vehicle of the platooning vehicle pair, wherein the platoon control unit includes a processor, a non-transient memory device operatively coupled with the processor, and logic stored in the non-transient memory and executable by the processor to determine authenticity of deceleration command signals.

The method of the further example embodiment includes receiving by a first sensor operatively coupled with the platoon control unit receive a first key verification signal from the associated leading vehicle of the platooning vehicle pair, the first key verification signal comprising first key verification data representative of a first encoding scheme selected by an associated platoon control unit of the associated leading vehicle used in generating by the associated leading vehicle an encoded deceleration command signal in accordance with the selected first encoding scheme; and The method of the further example embodiment includes receiving by a second sensor operatively coupled with the platoon control unit the encoded deceleration command signal from the associated leading vehicle of the platooning vehicle pair, the encoded deceleration command signal comprising proffered deceleration command data selectively usable by the associated following vehicle to effect a deceleration operation of the associated following vehicle.

The method of the further example embodiment includes executing the logic of the platoon control unit by the processor to select a first decoding scheme in accordance with the first key verification data from the first key verification signal.

The method of the further example embodiment includes executing the logic of the platoon control unit by the processor to apply the selected first decoding scheme to the encoded deceleration command signal to obtain potential deceleration command data.

The method of the further example embodiment includes executing the logic of the platoon control unit by the processor to compare the potential deceleration command data with a predetermined threshold criteria to selectively determine the potential deceleration command data to be the authentic deceleration command data in accordance with a result of the comparing.

In accordance with yet a further example embodiment, the method further comprises executing the logic of the platoon control unit by the processor to selectively determine the potential deceleration command data to be or as being authentic in accordance with the potential deceleration command data having a substantially constant value within bounds of the predetermined threshold criteria over a predetermined time period, and to selectively determine the potential deceleration command data to be or as being inauthentic (not authentic) in accordance with the potential deceleration command data having a substantially non-constant value within the bounds of the predetermined threshold criteria over the predetermined time period.

In accordance with yet a further example embodiment, the method further includes executing the logic of the platoon control unit by the processor to select a first decoding profile as the first decoding scheme in accordance with the first key verification data from the first key verification signal, and executing the logic of the platoon control unit by the processor to apply the selected first decoding scheme by subtracting the first decoding profile from the encoded deceleration command signal to obtain the potential deceleration command data. In the example embodiment, the method further comprises executing the logic of the platoon control unit by the processor to select the first decoding profile from among a plurality of predetermined decoding waveforms in accordance with the first key verification data from the first key verification signal.

With reference now to FIG. 11, a method 1100 is illustrated for determining authenticity of a deceleration command signal received by a following vehicle (20) from a leading vehicle (10) of a platooning vehicle pair (PP) comprising the leading and following vehicles cooperatively travelling seriatim as a platoon (P) along a roadway. The method comprises a first step 1110 of providing a platoon control unit in the following vehicle (20) of the platooning vehicle pair (PP). In the example embodiment, the platoon control unit comprises a processor, a non-transient memory device operatively coupled with the processor, and logic stored in the non-transient memory and executable by the processor to determine authenticity of deceleration command signals.

In step 1120, the communication receiver operatively coupled with the platoon control unit receives a deceleration command signal (Decel_Sig) from the leading vehicle (10) of the platooning vehicle pair (PP). In the example embodiment, the deceleration command signal (Decel_Sig) comprises deceleration command data (Decel_Data) selectively usable by the following vehicle (20) to effect a deceleration operation of the following vehicle (20).

In step 1130, the communication receiver operatively coupled with the platoon control unit receives a first verification signal (Ver_Sig) from the leading vehicle (10) of the platooning vehicle pair (PP). In the example embodiment, the first verification signal (Ver_Sig) comprises first verification data (Ver_Data) representative of an encryption by a platoon control unit of the leading vehicle (10) of deceleration command data (Decel_Data) in accordance with an encryption algorithm.

In step 1140, the global position sensor (GPS) receiver operatively coupled with the platoon control unit receives a global position signal (GPS_Sig) from a source of global position information. In the example embodiment, the global position signal comprises global position data (GPS_Data) representative of a position of the following vehicle (20) relative to the roadway.

In step 1150, the sensor operatively coupled with the platoon control unit and disposed in the following vehicle (20) senses a relative position between the following vehicle (20) and the leading vehicle (10).

In step 1160, the sensor operatively coupled with the platoon control unit and disposed in the following vehicle (20) generates relative distance data (Dist_A_B) representative of the sensed relative position between the following vehicle (20) and the leading vehicle (10).

The logic of the platoon control unit is executed by the processor in step 1170 to generate collective operational command data (Op_Cmd_Data) in accordance with a predetermined combination of the global position data (GPS_Data), the relative distance data (Dist_A_B), and the deceleration command data (Decel_Data).

In step 1180 the logic of the platoon control unit is executed by the processor to selectively determine authenticity of the deceleration command signal (Decel_Sig) in accordance with a result of a comparison between the collective operational command data (Op_Cmd_Data) and the first verification data (Ver_Data).

Figure 12:
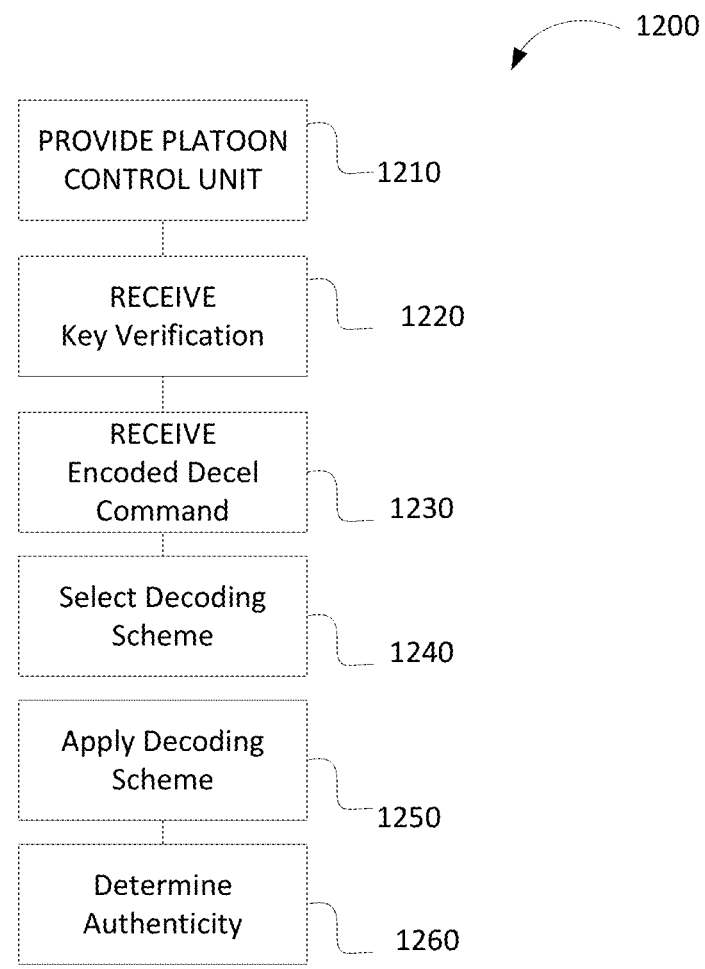
FIG. 12 is a flow diagram showing a method of determining authenticity of a deceleration command signal received by the following vehicle from the associated leading vehicle of a platooning vehicle pair cooperatively travelling seriatim as a platoon along an associated roadway in accordance with the second and third example embodiments of FIGS. 6, 7, 8a-8e, 9a, 9b, 10a, and 10b.

FIG. 12 is a flow diagram showing a method of determining authenticity of a deceleration command signal received by the following vehicle from the associated leading vehicle of a platooning vehicle pair cooperatively travelling seriatim as a platoon along an associated roadway in accordance with the second and third example embodiments of FIGS. 6, 7, 8a-8e, 9a, 9b, 10a, and 10b. With reference now to that Figure, a method 1200 is illustrated for determining authenticity of a deceleration command signal received by an associated following vehicle (20) from an associated leading vehicle (10) of a platooning vehicle pair (PP) comprising the leading and following vehicles cooperatively travelling seriatim as a platoon (P) along an associated roadway. The method comprises a first step 1210 of providing a platoon control unit in the following vehicle (20) of the platooning vehicle pair (PP). In the example embodiment, the platoon control unit comprises a processor, a non-transient memory device operatively coupled with the processor, and logic stored in the non-transient memory and executable by the processor to determine authenticity of deceleration command signals.

In step 1220 a first sensor operatively coupled with the platoon control unit receives a first key verification signal (1_Key_Ver_Sig) from the leading vehicle (10) of the platooning vehicle pair (PP). In the example embodiment, the first key verification signal (1_Key_Ver_Sig) comprises first key verification data (1_Key_Ver_Data) representative of a first encoding scheme selected by the platoon control unit of the leading vehicle (10) used in generating by the leading vehicle (10) an encoded deceleration command signal (Decl_Sig) in accordance with the selected first encoding scheme.

In step 1230 a second sensor operatively coupled with the platoon control unit receives the encoded deceleration command signal (Decel_Sig) from the leading vehicle (10) of the platooning vehicle pair (PP). In the example embodiment, the encoded deceleration command signal (Decel_Sig) comprises proffered deceleration command data (Prof_Decel_Data) selectively usable by the following vehicle (20) to effect a deceleration operation of the following vehicle (20).

The logic of the platoon control unit is executed in step 1240 by the processor to select a first decoding scheme in accordance with the first key verification data (1_Key_Ver_Data) from the first key verification signal (1_Key_Ver_Sig).

In step 1250 the logic of the platoon control unit is executed by the processor to apply the selected first decoding scheme to the encoded deceleration command signal (Decel_Sig) to obtain potential deceleration command data (Decel_Data?).

In step 1260 the logic of the platoon control unit is further executed by the processor to compare the potential deceleration command data (Decel_Data?) with a predetermined threshold criteria (Criteria) to selectively determine the potential deceleration command data (Decel_Data?) to be the authentic deceleration command data (Auth_Decel_Data) in accordance with a result of the comparing.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system for determining authenticity of a signal received by an associated following vehicle from an associated leading vehicle of a platooning vehicle pair comprising the associated leading and following vehicles cooperatively travelling as a platoon along an associated roadway, the system comprising:

a platoon control unit configured to be disposed in the associated following vehicle of the platooning vehicle pair, the platoon control unit comprising:
  a processor;
  a non-transient memory device operatively coupled with the processor; and
  logic stored in the non-transient memory and executable by the processor to determine authenticity of signals;
a communication receiver operatively coupled with the platoon control unit, the communication receiver being operable to:
  receive a deceleration command signal from the associated leading vehicle of the platooning vehicle pair, the deceleration command signal comprising deceleration command data selectively usable by the associated following vehicle to effect a deceleration operation of the associated following vehicle; and
  receive a first verification signal from the associated leading vehicle of the platooning vehicle pair, the first verification signal comprising first verification data representative of an encryption in accordance with an encryption algorithm by an associated platoon control unit of the associated leading vehicle of:
    the deceleration command data;
    physical characteristic data representative of a physical length characteristic of the associated leading vehicle; and
    leading vehicle global position data representative of a position of the associated leading vehicle;
a global position sensor (GPS) receiver operatively coupled with the platoon control unit, the GPS receiver being operable to:
  receive a global position signal from an associated source of global position information, the global position signal comprising following vehicle global position data, the following vehicle global position data being representative of a position of the associated following vehicle; and
a sensor operatively coupled with the platoon control unit and being configured to be disposed in the associated following vehicle, the sensor being operable to:
  sense a relative position between the associated following vehicle and the associated leading vehicle; and
  generate relative distance data representative of the sensed relative position between the associated following vehicle and the associated leading vehicle,
wherein the logic of the platoon control unit is executable by the processor to generate collective operational command data in accordance with a predetermined combination of the following vehicle global position data, the relative distance data, and the deceleration command data,
wherein the logic of the platoon control unit is executable by the processor to selectively determine authenticity of the deceleration command signal in accordance with a result of a comparison between the collective operational command data and the first verification data.

2. The system according to claim 1, wherein the logic of the platoon control unit is executable by the processor to:
  determine the deceleration command signal authentic in accordance with a matching result of the comparison between the collective operational command data and the first verification data; or
  determine the deceleration command signal inauthentic in accordance with a mis-matching result of the comparison between the collective operational command data and the first verification data.

3. The system according to claim 2, wherein the platoon control unit is operative to generate a deceleration demand signal responsive to determining the deceleration command signal authentic, the deceleration demand signal being used by the associated following vehicle to manage participation in the platoon together with the associated leading vehicle by initiating a deceleration in accordance with the deceleration command data received from the associated leading vehicle.

4. The system according to claim 2, wherein
the logic of the platoon control unit is executable by the processor to generate collective operational command data in accordance with a predetermined sum combination of the global position data, the relative distance data, and the deceleration command data.

5. The system according to claim 4, wherein
the logic of the platoon control unit is executable by the processor to generate the collective operational command data in accordance with a predetermined weighted sum combination of the following vehicle global position data, the relative distance data, and the deceleration command data.

6. The system according to claim 2, wherein
the logic of the platoon control unit is executable by the processor to generate second verification data in accordance with a weighted sum combination of the following vehicle global position data with second deceleration command data of the associated following vehicle and physical characteristic data representative of a physical length characteristic of the associated following vehicle.

7. The system according to claim 6, further comprising:
a transmitter operatively coupled with the platoon control unit, the transmitter being operable to:
convert the second verification data into a second verification signal;
convert the second deceleration command data of the associated following vehicle into a second deceleration command signal;
transmit the second verification signal from the associated following vehicle of the platooning vehicle pair; and
transmit the second deceleration command signal from the associated following vehicle of the platooning vehicle pair.

8. A method for determining authenticity of a signal received by an associated following vehicle from an associated leading vehicle of a platooning vehicle pair comprising the associated leading and following vehicles cooperatively travelling as a platoon along an associated roadway, the method comprising:
providing a platoon control unit in the associated following vehicle of the platooning vehicle pair, the platoon control unit comprising a processor, a non-transient memory device operatively coupled with the processor, and logic stored in the non-transient memory and executable by the processor to determine authenticity of signals;
receiving by an associated communication receiver operatively coupled with the platoon control unit:
a deceleration command signal from the associated leading vehicle of the platooning vehicle pair, the deceleration command signal comprising deceleration command data selectively usable by the associated following vehicle to effect a deceleration operation of the associated following vehicle; and
a first verification signal from the associated leading vehicle of the platooning vehicle pair, the first verification signal comprising first verification data representative of an encryption in accordance with an encryption algorithm by an associated platoon control unit of:
the associated leading vehicle of the deceleration command data;
physical characteristic data representative of a physical length characteristic of the associated leading vehicle; and
leading vehicle global position data representative of a position of the associated leading vehicle;
receiving by an associated global position sensor (GPS) receiver operatively coupled with the platoon control unit:
a global position signal from an associated source of global position information, the global position signal comprising following vehicle global position data, the following vehicle global position data being representative of a position of the associated following vehicle;
using an associated sensor operatively coupled with the platoon control unit and being configured to be disposed in the associated following vehicle:
sensing a relative position between the associated following vehicle and the associated leading vehicle; and
generating relative distance data representative of the sensed relative position between the associated following vehicle and the associated leading vehicle; and
executing the logic of the platoon control unit by the processor to:
generate collective operational command data in accordance with a predetermined combination of the following vehicle global position data, the relative distance data, and the deceleration command data; and
selectively determine authenticity of the deceleration command signal in accordance with a result of a comparison between the collective operational command data and the first verification data.

9. The method according to claim 8, further comprising executing the logic of the platoon control unit by the processor to:
determine the deceleration command signal authentic in accordance with a matching result of the comparison between the collective operational command data and the first verification data; or
determine the deceleration command signal inauthentic in accordance with a mis-matching result of the comparison between the collective operational command data and the first verification data.

10. The method according to claim 9, further comprising:
operating the platoon control unit to generate a deceleration demand signal responsive to determining the deceleration command signal authentic, the deceleration demand signal being used by the associated following vehicle to manage participation in the platoon together with the associated leading vehicle by initiating a deceleration in accordance with the deceleration command data received from the associated leading vehicle.

11. The method according to claim 9, further comprising:
executing the logic of the platoon control unit by the processor to generate collective operational command data in accordance with a predetermined sum combination of the global position data, the relative distance data, and the deceleration command data.

12. The method according to claim 11, further comprising:
executing the logic of the platoon control unit by the processor to generate collective operational command data in accordance with a predetermined weighted sum combination of the following vehicle global position data, the relative distance data, and the deceleration command data.

13. The method according to claim 9, further comprising:
executing the logic of the platoon control unit by the processor to generate second verification data in accordance with a weighted sum combination of the following vehicle global position data with second deceleration command data of the associated following vehicle and physical characteristic data representative of a physical length characteristic of the associated following vehicle.

14. The method according to claim 13, further comprising:
converting, by a transmitter operatively coupled with the platoon control unit, the second verification data into a second verification signal;
converting, by the transmitter, the second deceleration command data of the associated following vehicle into a second deceleration command signal;
transmitting, by the transmitter, the second verification signal from the associated following vehicle of the platooning vehicle pair; and
transmitting, by the transmitter, the second deceleration command signal from the associated following vehicle of the platooning vehicle pair.

15. A system for determining authenticity of a signal received by an associated following vehicle from an associated leading vehicle of a platooning vehicle pair comprising the associated leading and following vehicles cooperatively travelling as a platoon along an associated roadway, the system comprising:
a platoon control unit configured to be disposed in the associated following vehicle of the platooning vehicle pair, the platoon control unit comprising:
a processor;
a non-transient memory device operatively coupled with the processor; and
logic stored in the non-transient memory and executable by the processor to determine authenticity of signals;
a first sensor operatively coupled with the platoon control unit and being configured to be disposed in the associated following vehicle, the first sensor being operable to:
receive a first key verification signal from the associated leading vehicle of the platooning vehicle pair, the first key verification signal comprising first key verification data representative of a first encoding scheme selected by an associated platoon control unit of the associated leading vehicle used in generating by the associated leading vehicle an encoded deceleration command signal in accordance with the selected first encoding scheme; and
a second sensor operatively coupled with the platoon control unit and being configured to be disposed in the associated following vehicle, the second sensor being operable to:
receive the encoded deceleration command signal from the associated leading vehicle of the platooning vehicle pair, the encoded deceleration command signal comprising proffered deceleration command data selectively usable by the associated following vehicle to effect a deceleration operation of the associated following vehicle,
wherein the logic of the platoon control unit is executable by the processor to select a first decoding scheme in accordance with the first key verification data from the first key verification signal,
wherein the logic of the platoon control unit is executable by the processor to apply the selected first decoding scheme to the proffered deceleration command data of the encoded deceleration command signal to obtain potential deceleration command data,
wherein the logic of the platoon control unit is executable by the processor to selectively determine the potential deceleration command data to be authentic deceleration command data usable by the associated following vehicle to effect the deceleration operation in accordance with the potential deceleration command data having a substantially constant value within bounds of a predetermined threshold criteria over a predetermined time period.

16. The system according to claim 15, wherein the logic of the platoon control unit is executable by the processor to selectively:
to be inauthentic deceleration command data not usable by the associated following vehicle to effect the deceleration operation in accordance with the potential deceleration command data having a substantially non-constant value within the bounds of the predetermined threshold criteria over the predetermined time period.

17. The system according to claim 15, wherein the logic of the platoon control unit is executable by the processor to:
select a first decoding profile as the first decoding scheme in accordance with the first key verification data from the first key verification signal; and
apply the selected first decoding scheme by subtracting the first decoding profile from the encoded deceleration command signal to obtain the potential deceleration command data.

18. The system according to claim 17, wherein the logic of the platoon control unit is executable by the processor to select the first decoding profile from among a plurality of predetermined decoding waveforms in accordance with the first key verification data from the first key verification signal.

19. A method for determining authenticity of a signal received by an associated following vehicle from an associated leading vehicle of a platooning vehicle pair comprising the associated leading and following vehicles cooperatively travelling as a platoon along an associated roadway, the method comprising:
providing a platoon control unit in the associated following vehicle of the platooning vehicle pair, the platoon control unit comprising a processor, a non-transient memory device operatively coupled with the processor, and logic stored in the non-transient memory and executable by the processor to determine authenticity of signals;
receiving by a first sensor operatively coupled with the platoon control unit a first key verification signal from the associated leading vehicle of the platooning vehicle pair, the first key verification signal comprising first key verification data representative of a first encoding scheme selected by an associated platoon control unit of the associated leading vehicle used in generating by the associated leading vehicle an encoded deceleration command signal in accordance with the selected first encoding scheme; and receiving by a second sensor operatively coupled with the platoon control unit the encoded deceleration command signal from the associated leading vehicle of the platooning vehicle pair, the encoded deceleration command signal comprising proffered deceleration command data selectively usable by the associated following vehicle to effect a deceleration operation of the associated following vehicle;

executing the logic of the platoon control unit by the processor to select a first decoding scheme in accordance with the first key verification data from the first key verification signal;

executing the logic of the platoon control unit by the processor to apply the selected first decoding scheme to the proffered deceleration command data of the encoded deceleration command signal to obtain potential deceleration command data; and executing the logic of the platoon control unit by the processor to selectively determine the potential deceleration command data to be authentic deceleration command data usable by the associated following vehicle to effect the deceleration operation in accordance with the potential deceleration command data having a substantially constant value within bounds of a predetermined threshold criteria over a predetermined time period.

20. The method according to claim 19, further comprising executing the logic of the platoon control unit by the processor to selectively:

determine the potential deceleration command data to be inauthentic deceleration command data not usable by the associated following vehicle to effect the deceleration operation in accordance with the potential deceleration command data having a substantially non-constant value within the bounds of the predetermined threshold criteria over the predetermined time period.

21. The method according to claim 19, further comprising:

executing the logic of the platoon control unit by the processor to select a first decoding profile as the first decoding scheme in accordance with the first key verification data from the first key verification signal; and executing the logic of the platoon control unit by the processor to apply the selected first decoding scheme by subtracting the first decoding profile from the encoded deceleration command signal to obtain the potential deceleration command data.

22. The method according to claim 21, further comprising executing the logic of the platoon control unit by the processor to select the first decoding profile from among a plurality of predetermined decoding waveforms in accordance with the first key verification data from the first key verification signal.

* * * * *